(12) United States Patent
Tomlinson et al.

(10) Patent No.: US 11,100,071 B2
(45) Date of Patent: Aug. 24, 2021

(54) KEY-VALUE STORE TREE DATA BLOCK SPILL WITH COMPACTION

(71) Applicant: Micron Technology, Inc., Boise, ID (US)

(72) Inventors: Alexander Tomlinson, Austin, TX (US); Greg A. Becker, Austin, TX (US); Gaurav Sanjay Ramdasi, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 16/156,440

(22) Filed: Oct. 10, 2018

(65) Prior Publication Data

US 2020/0117728 A1    Apr. 16, 2020

(51) Int. Cl.
*G06F 16/22* (2019.01)
*G06F 7/14* (2006.01)
*G06F 16/23* (2019.01)

(52) U.S. Cl.
CPC ............ *G06F 16/2246* (2019.01); *G06F 7/14* (2013.01); *G06F 16/2365* (2019.01)

(58) Field of Classification Search
None
See application file for complete search history.

(56) References Cited

U.S. PATENT DOCUMENTS

| | | | |
|---|---|---|---|
| 5,204,958 A | 4/1993 | Cheng et al. | |
| 5,530,850 A | 6/1996 | Ford et al. | |
| 6,175,835 B1 | 1/2001 | Shadmon | |
| 6,597,957 B1 | 7/2003 | Beakley | |
| 8,738,657 B2 | 5/2014 | Kuno et al. | |
| 9,075,710 B2 | 7/2015 | Talagala et al. | |
| 9,367,260 B1 | 6/2016 | Natanzon | |
| 9,400,816 B1 | 7/2016 | Gubarev et al. | |
| 9,858,301 B1 | 1/2018 | Hardy et al. | |
| 10,706,105 B2 | 7/2020 | Boles | |
| 10,706,106 B2 | 7/2020 | Boles et al. | |
| 10,719,495 B2 | 7/2020 | Boles et al. | |
| 10,725,988 B2 | 7/2020 | Boles et al. | |

(Continued)

FOREIGN PATENT DOCUMENTS

| CN | 101515298 | 9/2013 |
|---|---|---|
| CN | 105095287 | 11/2015 |

(Continued)

OTHER PUBLICATIONS

"International Application Serial No. PCT US2018 017043, International Search Report dated May 28, 2018", 3 pgs.

(Continued)

*Primary Examiner* — Pierre M Vital
*Assistant Examiner* — Andrew N Ho
(74) *Attorney, Agent, or Firm* — Schwegman Lundberg & Woessner, P.A.

(57) ABSTRACT

Aspects of the present disclosure provide for operations of a key-value tree data structure that: merge key-value sets within a given node by merging and rewriting key blocks of the key-value sets while rewriting or deferring rewrite of value blocks of the merged key-value sets based on whether one or more child nodes of the given node comprise a leaf node; and move one or more portions of the merged key-value set into one or more child nodes of the given node.

20 Claims, 14 Drawing Sheets

(56) References Cited

U.S. PATENT DOCUMENTS

| | | | |
|---|---|---|---|
| 10,852,978 | B2 | 12/2020 | Kurichiyath et al. |
| 2003/0176931 | A1* | 9/2003 | Pednault .............. G06N 20/00 |
| | | | 700/31 |
| 2004/0227758 | A1* | 11/2004 | Curry .................. G06T 7/12 |
| | | | 345/426 |
| 2005/0165865 | A1 | 7/2005 | Farmer |
| 2005/0171960 | A1* | 8/2005 | Lomet ............... G06F 16/2246 |
| 2008/0016066 | A1 | 1/2008 | Kuznetsov et al. |
| 2010/0146003 | A1* | 6/2010 | Bruso .................. G06F 16/2246 |
| | | | 707/797 |
| 2010/0246446 | A1 | 9/2010 | Du et al. |
| 2010/0262617 | A1* | 10/2010 | Shinjo ............... G06F 16/2246 |
| | | | 707/769 |
| 2010/0281013 | A1* | 11/2010 | Graefe ............... G06F 16/2246 |
| | | | 707/715 |
| 2011/0246503 | A1 | 10/2011 | Bender et al. |
| 2012/0011106 | A1 | 1/2012 | Reid et al. |
| 2012/0072656 | A1 | 3/2012 | Archak et al. |
| 2012/0223889 | A1 | 9/2012 | Medlock et al. |
| 2013/0080473 | A1 | 3/2013 | Kuno et al. |
| 2013/0103658 | A1* | 4/2013 | Travis ............... G06F 16/2477 |
| | | | 707/700 |
| 2013/0117524 | A1 | 5/2013 | Helman et al. |
| 2013/0204902 | A1* | 8/2013 | Wang ............... G06F 16/2365 |
| | | | 707/797 |
| 2013/0218840 | A1 | 8/2013 | Smith et al. |
| 2013/0275656 | A1 | 10/2013 | Talagala et al. |
| 2013/0306276 | A1 | 11/2013 | Duchesneau |
| 2014/0064490 | A1 | 3/2014 | Wang et al. |
| 2014/0074841 | A1 | 3/2014 | Majnemer et al. |
| 2014/0082028 | A1 | 3/2014 | Sivasubramanian et al. |
| 2014/0129530 | A1 | 5/2014 | Raufman |
| 2014/0222870 | A1 | 8/2014 | Zhang |
| 2014/0279944 | A1 | 9/2014 | Ghandeharizadeh et al. |
| 2014/0344287 | A1 | 11/2014 | Carvalho et al. |
| 2015/0058291 | A1 | 2/2015 | Earl et al. |
| 2015/0127658 | A1 | 5/2015 | Ding et al. |
| 2015/0178375 | A1 | 6/2015 | Ishizaki |
| 2015/0244558 | A1 | 8/2015 | Tully et al. |
| 2015/0254272 | A1 | 9/2015 | Regni et al. |
| 2015/0286695 | A1* | 10/2015 | Kadayam .............. G06F 11/10 |
| | | | 707/639 |
| 2015/0293958 | A1 | 10/2015 | Chen et al. |
| 2015/0347495 | A1 | 12/2015 | Wang et al. |
| 2016/0026666 | A1 | 1/2016 | Namiki |
| 2016/0173445 | A1 | 6/2016 | Mosko et al. |
| 2016/0275094 | A1 | 9/2016 | Lipcon |
| 2016/0335299 | A1 | 11/2016 | Vemulapati et al. |
| 2017/0017411 | A1 | 1/2017 | Choi et al. |
| 2017/0141791 | A1 | 5/2017 | Balegar et al. |
| 2017/0185622 | A1 | 6/2017 | Prahlad et al. |
| 2017/0192989 | A1 | 7/2017 | Georgiev et al. |
| 2017/0212680 | A1 | 7/2017 | Waghulde |
| 2018/0011766 | A1 | 1/2018 | Lee et al. |
| 2018/0067975 | A1 | 3/2018 | Kato et al. |
| 2018/0089074 | A1 | 3/2018 | Li et al. |
| 2018/0225315 | A1 | 8/2018 | Boles et al. |
| 2018/0225316 | A1 | 8/2018 | Boles et al. |
| 2018/0225321 | A1 | 8/2018 | Boles et al. |
| 2018/0225322 | A1 | 8/2018 | Boles et al. |
| 2018/0253386 | A1 | 9/2018 | Qiu et al. |
| 2019/0034427 | A1 | 1/2019 | Trika et al. |
| 2019/0065557 | A1 | 2/2019 | Boles et al. |
| 2020/0004851 | A1 | 1/2020 | Lambov |
| 2020/0117744 | A1 | 4/2020 | Tomlinson |
| 2020/0192590 | A1 | 6/2020 | Kurichiyath et al. |
| 2020/0192940 | A1 | 6/2020 | Tomlinson |
| 2020/0210482 | A1 | 7/2020 | Becker et al. |
| 2020/0257669 | A1 | 8/2020 | Boles et al. |
| 2020/0334294 | A1 | 10/2020 | Boles et al. |
| 2020/0334295 | A1 | 10/2020 | Boles et al. |
| 2020/0349139 | A1 | 11/2020 | Boles et al. |

FOREIGN PATENT DOCUMENTS

| | | |
|---|---|---|
| CN | 110268394 A | 9/2019 |
| CN | 110268399 A | 9/2019 |
| CN | 110291518 A | 9/2019 |
| CN | 110383261 A | 10/2019 |
| JP | 2011233063 | 11/2011 |
| JP | 2017021494 | 1/2017 |
| KR | 20020059238 | 7/2002 |
| KR | 20040103495 | 12/2004 |
| KR | 20130018602 A | 2/2013 |
| KR | 20130115929 A | 10/2013 |
| KR | 20170008152 A | 1/2017 |
| TW | 200421114 | 10/2004 |
| TW | 200822066 | 5/2008 |
| TW | 200836084 | 9/2008 |
| TW | 201342088 | 10/2013 |
| TW | 201408070 | 2/2014 |
| TW | I454166 | 9/2014 |
| TW | 201837720 | 10/2018 |
| TW | 201841122 | 11/2018 |
| TW | 201841123 | 11/2018 |
| TW | 201842454 | 12/2018 |
| WO | 2018148149 | 8/2018 |
| WO | 2018148151 | 8/2018 |
| WO | 2018148198 | 8/2018 |
| WO | 2018148203 | 8/2018 |
| WO | WO-2020076580 A1 | 4/2020 |
| WO | WO-2020076581 A1 | 4/2020 |
| WO | WO-2020123628 A1 | 6/2020 |
| WO | WO-2020123632 A1 | 6/2020 |

OTHER PUBLICATIONS

"International Application Serial No. PCT US2018 017043, Written Opinion dated May 28, 2018", 7 pgs.

"International Application Serial No. PCT US2018 016892, International Search Report dated Jun. 4, 2018", 3 pgs.

"International Application Serial No. PCT US2018 016892, Written Opinion dated Jun. 4, 2018", 9 pgs.

"International Application Serial No. PCT US2018 016906, International Search Report dated Jun. 4, 2018", 3 pgs.

"International Application Serial No. PCT US2018 016906, Written Opinion dated Jun. 4, 2018", 9 pgs.

"International Application Serial No. PCT US2018 017056, International Search Report dated Jun. 4, 2018", 4 pgs.

"International Application Serial No. PCT US2018 017056, Written Opinion dated Jun. 4, 2018", 7 pgs.

"NVM Express Revision 1.2 specification", NVM Express, [Online] Retrieved from the internet:http: nvmexpress.org resources specifications, (Nov. 3, 2014), 1-205.

"Taiwanese Application Serial No. 107104545, Office Action dated Dec. 21, 2018", W English Translation, 17 pgs.

"U.S. Appl. No. 15/428,951, Non Final Office Action dated Jan. 7, 2019", 29 pgs.

"Taiwanese Application Serial No. 107104550, Office Action dated Jan. 9, 2019", W English Translation, 28 pgs.

"U.S. Appl. No. 15/428,877, Non Final Office Action dated Jan. 23, 2019", 39 pgs.

"U.S. Appl. No. 15/428,912, Non Final Office Action dated Jan. 23, 2019", 36 pgs.

"U.S. Appl. No. 15/428,976, Non Final Office Action dated Jan. 28, 2019", 34 pgs.

"Taiwanese Application Serial No. 107104566, First Office Action dated Feb. 14, 2019", w English Translation, 36 pgs.

"Taiwanese Application Serial No. 107104242, Office Action dated Feb. 25, 2019", w English Translation, 22 pgs.

"Taiwanese Application Serial No. 107104545, Response filed Mar. 19, 2019 to Office Action dated Dec. 21, 2018", w English Claims, 15 pgs.

"Transaction Log", Wikipedia, (Accessed on Apr. 8, 2019), 3 pgs.

"U.S. Appl. No. 15/428,951, Response filed Apr. 8, 2019 to Non Final Office Action dated Jan. 1, 2019", 21 pgs.

(56) References Cited

OTHER PUBLICATIONS

"Taiwanese Application Serial No. 107104545, First Office Action dated Apr. 11, 2019", w English translation, 44 pgs.
"Xingbo Wu and Yuehai Xu", LSM-trie: An LSM-tree-based Ultra-Large Key-Value Store for Small Data, https: www.usenix.org system files conference atc15 atc15-paper-wu.pdf, (Jul. 8-10, 2015), 13 pgs.
"Taiwanese Application Serial No. 107104550, Response filed Apr. 11, 2019 to Office Action dated Jan. 9, 2019", w English Claims, 93 pgs.
"U.S. Appl. No. 15/428,877, Response filed May 23, 2019 to Non Final Office Action dated Jan. 23, 2019", 18 pgs.
"U.S. Appl. No. 15/428,912, Response filed May 23, 2019 to Non Final Office Action dated Jan. 23, 2019", 15 pgs.
"U.S. Appl. No. 15/428,976, Response filed May 24, 2019 to Non Final Office Action dated Jan. 28, 2019", 15 pgs.
"Taiwanese Application Serial No. 107104242, Response filed Jun. 4, 2019 to Office Action dated Feb. 25, 2019", w English Claims, 105 pgs.
"Taiwanese Application Serial No. 107104545, Response filed Jul. 12, 2019 to First Office Action dated Apr. 11, 2019", w English Claims, 124 pgs.
Amur, Hrishikesh, "Design of a Write-Optimized Data Store", [Online] Retrieved from the internet:https: smartech.gatech.edu handle 1853 53627, (2013), 12 pgs.
Clements, Austin T, "Scalable Address Spaces Using RCU Balanced Trees", (2012), 12 pgs.
Ghosh, Mainak, "Fast Compaction Algorithms for NoSQL Databases", IEEE 35th International Conference on Distributed Computing Systems, (2015), 10 pgs.
Kang, Jeong-UK, "The Multi-streamed Solid-State Drive", 5 pgs.
Lim, Heyontaek, "Towards Accurate and Fast Evaluation of Multi-Stage Log-Structured Designs", USENIX Association 14th USENIX Conference on File and Storage Technologies FAST 16, (2016), 149-166.
Lu, Lanyue, "WiscKey: Separating Keys from Values in SSD-conscious Storage", 14th USENIX Conference, (2016), 17 pgs.
O'Neil, Patrick E., "The Log-Structured Merge-Tree", ACTA Informatica 33(4), (1996).
Papapetrou, Odysseas, "Cardinality estimation and dynamic length adaptation for Bloom filters", 34 pgs.
Peng, Wang, "An Efficient Design and Implementation of LSM-Tree based Key-Value Store on Open-Channel SSD", Proceedings of the Ninth European Conference on Computer Systems (EuroSys 2014), Article No. 6, (Apr. 2014), 14 pgs.
Putze, Felix, "Cache-, Hash- and Space-Efficient Bloom Filters", (2007), 14 pgs.
Trong-Dat, Nguyen, "Opportunity of using Multi-Streamed SSD in MongoDB", In: Korea Computer Congress 2016, [Online] Retrieved from the internet:http: www.dbpia.co.kr Article NODE07018146, (Jun. 2016), 169-171.
Xingbo, Wu, "LSM-trie: An LSM-tree-based Ultra-Large Key-Value Store for Small Data", Proceedings of 2015 USENIX Annual Technical Conference (Jul. 8-10, 2015), 71-82.
Yuzhe, Tang, "Deferred Lightweight Indexing for Log-Structured Key-Value Stores", 15th IEEE ACM International Symposium on Cluster, Cloud and Grid Computing (CCGrid), (May 4-7, 2015), 10 pgs.
"International Application Serial No. PCT/US2019/065692, International Search Report dated Apr. 3, 2020", 3 pgs.
"International Application Serial No. PCT/US2019/065692, Written Opinion dated Apr. 3, 2020", 4 pgs.
"International Application Serial No. PCT/US2019/065702, International Search Report dated Apr. 3, 2020", 3 pgs.
"International Application Serial No. PCT/US2019/065702, Written Opinion dated Apr. 3, 2020", 5 pgs.
"International Application Serial No. PCT/US2019/054243, International Search Report dated Jan. 22, 2020", 3 pgs.
"International Application Serial No. PCT/US2019/054243, Written Opinion dated Jan. 22, 2020", 4 pgs.
"International Application Serial No. PCT/US2019/054254, International Search Report dated Jan. 15, 2020", 3 pgs.
"International Application Serial No. PCT/US2019/054254, Written Opinion dated Jan. 15, 2020", 4 pgs.
"Taiwanese Application Serial No. 107104242, Response filed Jan. 2, 2020 to Office Action dated Oct. 2, 2019", w/ English Claims, 103 pgs.
"Taiwanese Application Serial No. 107104566, Decision of Rejection dated Jan. 20, 2020", w/ English Translation, 7 pgs.
"International Application Serial No. PCT/US2018/016892, International Preliminary Report on Patentability dated Aug. 22, 2019", 11 pgs.
"International Application Serial No. PCT/US2018/01690 , International Preliminary Report on Patentability dated Aug. 22, 2019", 11 pgs.
"International Application Serial No. PCT/US2018/017043, International Preliminary Report on Patentability dated Aug. 22, 2019", 9 pgs.
"International Application Serial No. PCT/US2018/017056, International Preliminary Report on Patentability dated Aug. 22, 2019", 9 pgs.
"Taiwanese Application Serial No. 107104242, Office Action dated Oct. 2, 2019",w/English translation, 31 pgs.
"Taiwanese Application Serial No. 107104545, Voluntary Amendment Filed Sep. 5, 2019", w/ English Claims, 113 pgs.
"Taiwanese Application Serial No. 107104566, Response filed Aug. 15, 2019 to First Office Action dated Feb. 14, 2019", w/ English Claims, 104 pgs.
U.S. Appl. No. 15/428,877, filed Feb. 9, 2017, KVS Tree.
U.S. Appl. No. 15/428,912, filed Feb. 9, 2017, Merge Tree Garbage Metrics.
U.S. Appl. No. 15/428,951, filed Feb. 9, 2017, Merge Tree Modifications for Maintenance Operations.
U.S. Appl. No. 15/428,976, filed Feb. 9, 2017, Stream Selection for Multi-Stream Storage Devices.
U.S. Appl. No. 16/220,646, filed Dec. 14, 2018, Key-Value Store Using Journaling With Selective Data Storage Format.
U.S. Appl. No. 16/220,729, filed Dec. 14, 2018, Key-Value Store Tree With Selective Use of Key Portion.
U.S. Appl. No. 16/156,400, filed Oct. 10, 2018, Counter-Based Compaction of Key-Value Store Tree Data Block.
U.S. Appl. No. 16/232,422, filed Dec. 26, 2018, Data Tree With Order-Based Node Traversal.
"Taiwanese Application Serial No. 107104566, Response filed Jul. 28, 2020 to Decision of Rejection dated Jan. 20, 2020", w/ English Claims, 36 pgs.
Bagwell, Phil, "Ideal Hash Trees", EPFL Technical Report, (2001), 19 pgs.
"Korean Application Serial No. 10-2019-7026304, Notice of Preliminary Rejection dated Nov. 30, 2020", w/ English translation, 9 pgs.
"Korean Application Serial No. 10-2019-7026327, Notice of Preliminary Rejection dated Oct. 19, 2020", w/ English translation, 20 pgs.
"Korean Application Serial No. 10-2019-7026327, Response filed Dec. 18, 2020 to Notice of Preliminary Rejection dated Oct. 19, 2020", w/ English Claims, 51 pgs.
"Korean Application Serial No. 10-2019-7026330, Notice of Preliminary Rejection dated Nov. 30, 2020", w/ English translation, 10 pgs.
"Korean Application Serial No. 10-019-7026533, Notice of Preliminary Rejection dated Dec. 26, 2020", w/ English translation, 12 pgs.
"Korean Application Serial No. 10-2019-7026304, Response filed Jan. 28, 2021 to Notice of Preliminary Rejection dated Nov. 30, 2020", w English Claims, 26 pgs.
"Korean Application Serial No. 10-2019-7026330, Response filed Feb. 1, 2021 to Notice of Preliminary Rejection dated Nov. 30, 2020", w English Claims, 31 pgs.
"Korean Application Serial No. 10-2019-7026533, Response filed Feb. 17, 2021 to Notice of Preliminary Rejection dated Dec. 26, 2020", w English Claims, 33 pgs.

(56) References Cited

OTHER PUBLICATIONS

"International Application Serial No. PCT US2019 054243, International Preliminary Report on Patentability dated Apr. 22, 21", 6 pgs.

"International Application Serial No. PCT US2019 054254, International Preliminary Report on Patentability dated Apr. 22, 21", 6 pgs.

"International Application Serial No. PCT US2019 065692, International Preliminary Report on Patentability dated Jun. 24, 21", 6 pgs.

"International Application Serial No. PCT US2019 065702, International Preliminary Report on Patentability dated Jun. 24, 21", 7 pgs.

* cited by examiner

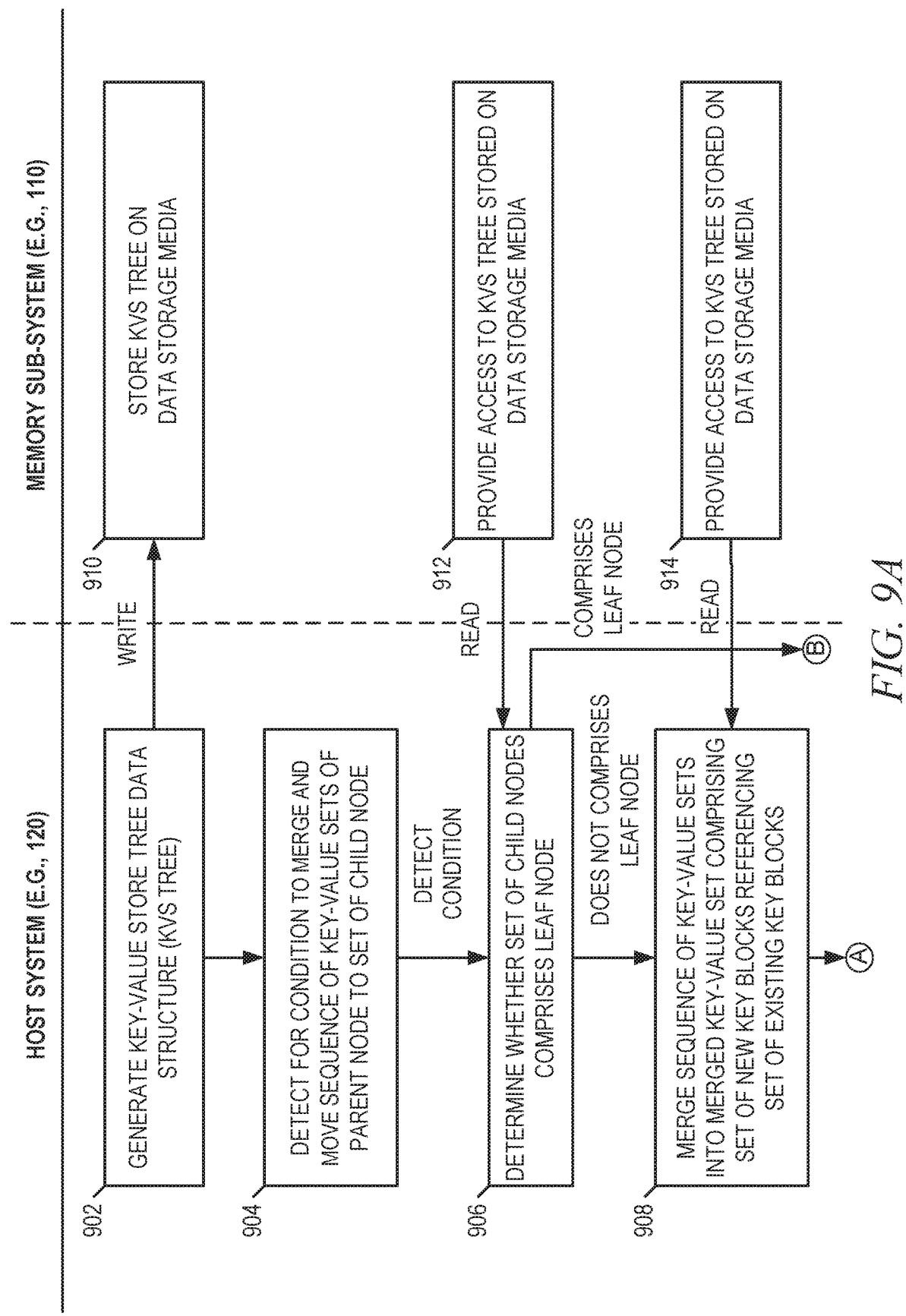

KEY-VALUE STORE TREE DATA BLOCK SPILL WITH COMPACTION

TECHNICAL FIELD

Embodiments of the disclosure relate generally to memory sub-systems and more specifically, to operation of a key-value store (KVS) tree data structure.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 9A through 9C provide an interaction diagram illustrating interactions between components of a computing environment in the context of an example embodiment in which a method for key merge move is performed.

DETAILED DESCRIPTION

Figure 1:
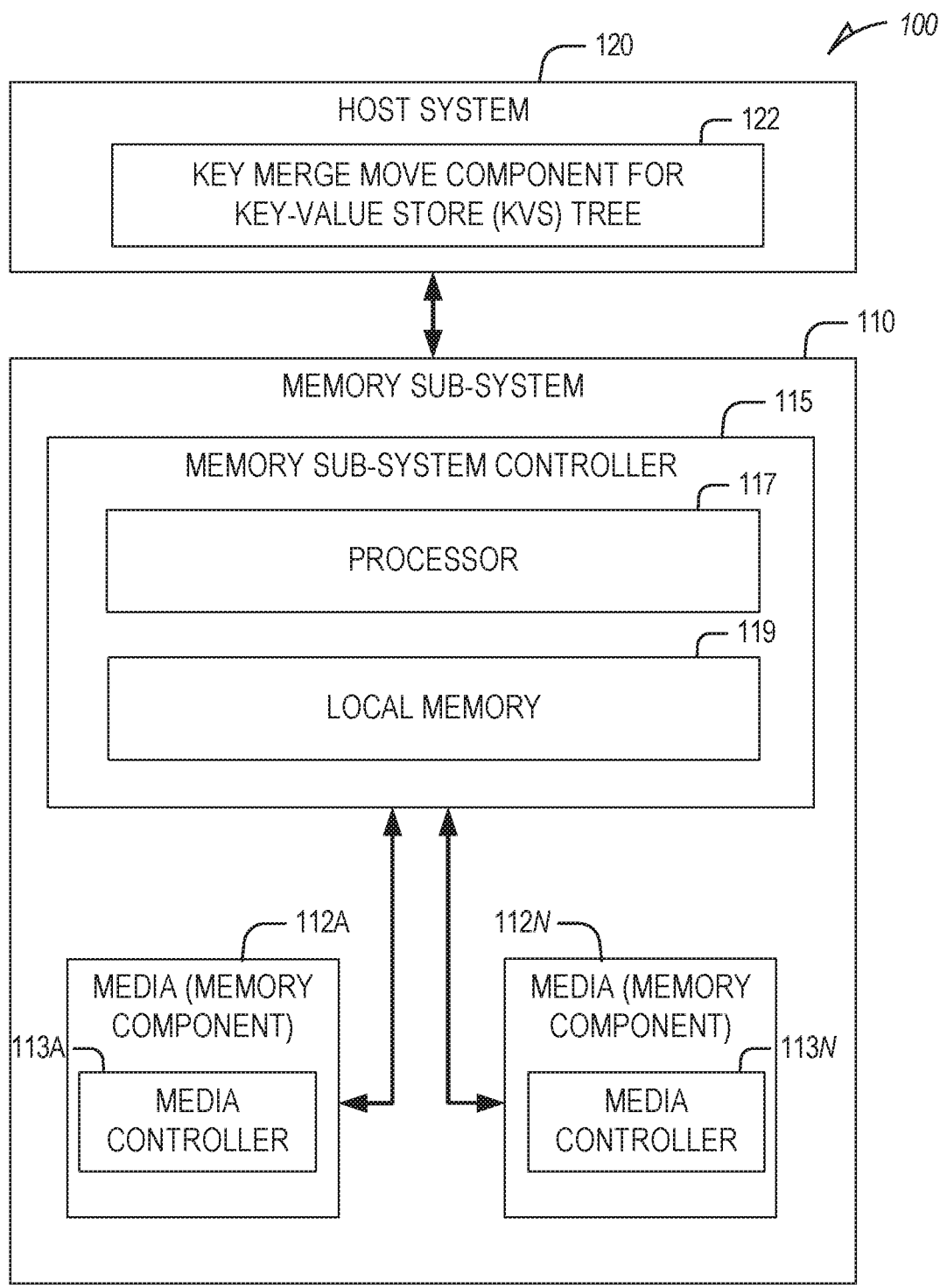
FIG. 1 is a block diagram illustrating an example computing environment including a memory sub-system, in accordance with some embodiments of the present disclosure.

Aspects of the present disclosure are directed to merging and moving key-value sets in a key-value tree data structure, which may be used by or in conjunction with a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, such as database storage and volume data storage (e.g., cloud storage), key-value data structures are used to store data on data storage media, such a pool of data storage media (media pool) implemented by one or more memory devices and presented as a single logical data storage volume comprising one or more media data blocks (media blocks). A key-value store (KVS) can comprise one or more key-value data structures to store and search for key-value pairs. The key-value data structures can permit efficient searches of stored data of key-value pairs, permit efficient storage of sparse data, or permit efficient storage of searchable data. Generally, key-value data structures accept a key-value pair for storage and are configured to respond to queries for a value based on a key. Key-value data structures may comprise such structures as tree data structures, examples of which include log-structured merge tree (LSM tree) and a key-value store (KVS) tree (also referred to herein as a key-value store tree data structure or KVS tree data structure).

Aspects of the present disclosure provide various embodiments for merging (e.g., compacting) key-value pair data of a node of a key-value tree data structure (KVS tree) by merging key data of the key-value pair data while deferring rewrite of value data of the key-value pair data, and then moving (e.g., spilling) the merged (e.g., compacted) key data into at least one of the node's child nodes. In doing so, such embodiments may permit value data to be shared among one or more internal nodes of the KVS tree, while reducing the number of times value data is rewritten in a KVS tree data as key-value pair data flows down the KVS tree (from the root node to a leaf node). For instance, some embodiments limit particular value data to being written only twice in a KVS tree (e.g., when the particular value data is initially written at the root node of the KVS tree and when the particular value data reaches and is rewritten at a leaf node). Depending on the embodiment, operations described herein may be performed on a host system, on a memory sub-system, or some combination of both. Without use of embodiments described herein, value data may be written H times, where H is the height of the KVS tree. A reduction in the number of value rewrites can benefit performance of a KVS tree and memory sub-system using the KVS tree, especially given that value data is often much larger in data size than key data. A reduction in the number of value rewrites in the KVS tree can not only reduce read and write amplification with respect to the KVS tree, but also can reduce device input/output (I/O) with respect to the data storage devices used to store the KVS tree.

As used herein, a key merge move operation collectively refers to operations of various embodiments that merge (e.g., compact) key data (e.g., key blocks) of key-value pair data of a node while deferring rewrite of value data (e.g., value blocks) of the key-value pair data, and that then move (e.g., spill) the merged (e.g., compacted) key data into at least one of the node's child nodes. A key merge move operation may also be known as a k-spill compaction operation, which can k-compact and then spill key-value sets. According to various embodiments, data within a node of the KVS tree comprises a set of key blocks (for storing keys) and a set of value blocks (for storing values) of key-value pairs. In this way, nodes of a KVS tree can store keys separate from their corresponding values, which provides the KVS tree performance benefits over an LSM tree. For such embodiments, the operations described herein may enable merging (e.g., compacting) key blocks within the node and moving (e.g., spilling) the merged (e.g., compacted) key blocks from the node to one or more child nodes, while retaining the value blocks within the node as-is and permitting those value blocks to be shared by other nodes of the KVS tree. By merging the key blocks (e.g., as part of a garbage collection process performed on the KVS tree), some embodiments reclaim (e.g., free up) memory space (e.g., media blocks) occupied on the data storage media (e.g., media pool) by older or deleted key blocks, and may further reduce the overall data size of the KVS tree, which can improve searchability on the KVS tree. By moving (e.g., spilling) the key blocks to one of the node's child nodes, some embodiments push older data (e.g., older key blocks and the value blocks they reference) deeper into the KVS tree while freeing up memory space in the node to receive newer data (e.g., key blocks).

As used herein, a KVS tree comprises a tree data structure comprising nodes with connections between parent and child nodes based on a predetermined derivation of a key (e.g., rather than the content of the tree). Each node can comprise an ordered (e.g., temporally ordered) sequence of key-value sets (also referred to herein as kvsets). Where temporally ordered, later key-value sets in the sequence can represent older key-value sets. The kvsets can comprise one or more key-value pairs, which permit values to be stored in the KVS tree with corresponding keys that reference the values. Accordingly, within a KVS tree, kvsets function as individual key and value stores organized in the nodes of the KVS tree. The key-value pairs within a given kvset may be key-sorted. Every key within a given kvset may be unique from the other keys in the kvset; however, keys within the KVS tree may not be unique (e.g., two different kvset within a single node or in different nodes of the KVS tree may include the same key). Each kvset may be immutable once written to a node (e.g., once placed/stored in a node, a kvset does not change). Though a kvset within a node may be immutable, the kvset may be deleted or some or all of the kvset's data contents may be added to a new kvset.

A kvset may comprise a key tree to store key entries of key-value pairs of the kvset, where a given key entry may comprise both a key and a reference to a value. A variety of data structures may be used to efficiently store and retrieve unique keys in the key tree (e.g., it may not even be a data tree), such as binary search trees, B-trees, etc. For example, the keys are stored in leaf nodes of the key tree, where a maximum key in any subtree of the key tree may be in a rightmost entry of a rightmost child, a rightmost edge of a first node of the key tree is linked to a sub-node of the key tree, and all keys in a subtree rooted at the sub-node of the key tree may be greater than all keys in the first node of the key tree. Alternatively, in another example described herein, key entries may be stored based on a radix-based key distribution (e.g., one that uses hashes of keys).

For some embodiments, key entries of the kvset are stored in a set of key data blocks (also referred to as key blocks or kblocks), which can comprise a primary key block and zero or more extension key blocks. Members of the set of key blocks may correspond to media data blocks (media blocks) for a data storage medium implemented by a memory device, such as an SSD, hard disk drive, etc. Each key block may comprise a header to identify it as a key block, and a primary key block of a kvset may comprise a list of media block identifications for the one or more extension key blocks of the kvset.

A primary key block may comprise a header to a key tree of the kvset. The header may comprise a number of values to assist or facilitate interactions with the keys, or kvset. For example, the primary key block, or header stored therein, may comprise a copy of a lowest key in a key tree of the kvset, or a copy of a highest key in a key tree of the kvset. The primary key block may comprise a list of media block identifications for a key tree of the kvset. Additionally, the primary key block may comprise a bloom filter header for a bloom filter of the kvset, and the primary key block may comprise a list of media block identifications for a bloom filter of the kvset.

For some embodiments, values of a kvset are stored in a set of value data blocks (also referred to herein as value blocks or vblocks). Each particular value block in the KVS tree may have a data generation number associated with it that indicates a sequence order at which the particular value block was initially generated for the KVS tree. In this way, the data generation number of a particular value block can serve as a time stamp for when the particular value block is initially generated. For instance, data generation numbers may start at a value of "1" for the first value block generated and added to (e.g., a kvset of) a root node of the KVS tree, and the second value block generated and added to (e.g., a kvset of) the root node of the KVS tree would have a data generation number of "2." The data generation number increases with each new value block that is generated and added to the KVS tree through the root node.

Members of the set of value blocks may correspond to media data blocks (media blocks) for a data storage medium implemented by a memory device, which as noted herein can comprise an SSD, hard disk drive, etc. Each value block may comprise a header to identify it as a value block. A value block may comprise a storage section to one or more values without separation between, where bits of a first value can run into bits of a second value on the data storage medium without a guard, container, or other delimiter between them. For various embodiments, a primary key block of a kvset comprises a list of media block identifications for value blocks in the set of value blocks for the kvset. In this way, a primary key block can manage storage references to value blocks within a kvset.

For some embodiments, a data marker associated with a key (hereafter, referred to as a tombstone) is used to indicate that the value corresponding to the key has been deleted. A tombstone may reside in the key entry in association with a key, and no value block space may be consumed for the key-value pair. According to some embodiments, the tombstone marks the deletion of the value associated with the key while avoiding the possibly expensive operation of purging the value from a KVS tree. For some embodiments, when a tombstone is encountered during a temporally ordered search of a KVS tree for a given key, a search process knows that a value corresponding to the given key has been deleted, even if an expired version of the key-value pair associated with that given key resides at a lower (e.g., older) location within the KVS tree.

For some embodiments, the primary key block includes a set of metrics for the kvset. For example, the set of metrics may comprise one or more of the following: a total number of keys stored in the kvset; or a number of keys with tombstone values stored in the kvset; a sum of all key lengths for keys stored in the kvset; a sum of all value lengths for keys stored in the kvset. The last two metrics may provide at least an approximate (if not exact) amount of storage consumed by the kvset. The set of metrics may also comprise, for example, an amount of unreferenced data in value-blocks (e.g., unreferenced values) of the kvset. This last metric can provide an estimate of the space that may be reclaimed in a maintenance operation (e.g., garbage collection operation performed on the KVS tree).

A key merge move operation of various embodiments may be performed in response to a variety of triggering conditions, such as a condition relating to one or more kvsets in a given node meeting specified or computed criteria. Examples of such kvset-related criteria comprise, without limitation, the number of kvsets within a given node, the addition (e.g., ingestion) of a new kvset by the given node (e.g., as a result of moving (e.g., spilling) a kvset from a parent node of the given node to the given node), the freeing of resources (e.g., media blocks) with respect to the given node, the total size of one or more kvsets within the given node, or the amount of data in the one or more kvsets available for garbage collection. One example of data available for garbage collection in a kvset comprises one or more key-value pairs or tombstones in the kvset rendered obsolete, for instance, by a key-value pair or tombstone in a newer kvset, or a key-value pair that has violated constraint (e.g., a time to live constraint). Another example comprises a condition for performing maintenance (e.g., garbage collection) on the KVS tree. Yet another example condition comprises receiving a request (e.g., from software application or an operating system of a host system) to initiate a key merge move operation with respect to one or more nodes of the KVS tree, where the request may also specify whether an entire sequence of kvsets or a subsequence of kvsets will be operated upon.

For some embodiment, a key merge move operation described herein comprises a combination of: merging kvsets (e.g., a sequence of kvsets) within a given node by merging key blocks of the kvsets (e.g., key compaction) while deferring rewrite of value blocks of the kvsets, and traversing a KVS tree (to one or more child nodes of the given node) to place portions of the resultant merged kvset into the one or more child nodes. Kvsets received by the key merge move operation (to be operated upon) may comprise some or all of the kvsets of a given node and, additionally, may comprise a temporally consecutive sequence of two or more kvsets of the given node. For example, the kvsets that the key merge move operation receives to operate on may comprise the entire sequence of kvsets of the given node or just a subsequence of kvsets at the tail end of a larger sequence of kvsets. Accordingly, as used herein, a sequence of kvsets can represent an entire sequence of kvsets of a given node or a subsequence of kvsets of the given node.

According to some embodiments, a KVS tree is generated and stored on data storage media, implemented by a memory sub-system, where the KVS tree can be used to store data on the data storage media as one or more key-value pairs. For some embodiments, once triggered to perform with respect to a given node of the KVS tree (e.g., based on a trigger condition), a key merge move determines whether a set of child nodes (e.g., all of the child nodes) of the given node comprises a leaf node, merges kvsets (e.g., a sequence of kvsets) of the given node based on whether the one or more child nodes comprise a leaf node, and then moves the resulting merged kvset to the one or more of the child nodes.

In response to determining that the set of child nodes does not comprise a leaf node (e.g., none of child nodes in the set are leaf nodes), the key merge move operation can merge a sequence (e.g., temporal sequence) of kvsets of the node to produce a merged kvset, where the resulting merged kvset comprises a set of new key blocks that reference a set of existing value blocks of the sequence of kvsets. The set of new key blocks may be generated based on (e.g., copied from) a set of existing key blocks of the sequence of kvsets. For example, the set of new key blocks may be generated based on the set of existing key blocks of the sequence of kvsets by copying values (e.g., key values and references to existing value blocks) of the set of existing key blocks to the set of new key blocks. Those existing value blocks of the sequence of kvsets that are not referenced by the set of new key-value blocks are retained (e.g., not deleted) but are considered unreferenced and may be shared by two key blocks of different kvsets (e.g., two kvsets of an internal node of the KVS tree). After the set of new key blocks has been generated, the key merge move operation can delete, from the node, each particular key-value set in the sequence of key-value sets, and delete all key blocks of each particular key-value set while leaving all value blocks of each particular key-value set (e.g., preserved as-is). The preserved value blocks can comprise value blocks referenced by the set of new key blocks, value blocks not referenced by any of the set of new key blocks, or both. All value blocks of the sequence of kvsets (which are preserved as-is) can be moved to the merged kvset. The foregoing operations may be collectively referred to herein as a key compaction (k-compaction), which may be regarded as a form of garbage collection to remove obsolete key blocks and free resources (e.g., media blocks of a data storage media) occupied by those obsolete key blocks.

Alternatively, in response to determining that the set of child nodes only comprises one or more leaf nodes, the key merge move operation can merge a sequence (e.g., temporal sequence) of kvsets of the node to produce a merged kvset, where the resulting merged kvset comprises a set of new key blocks that reference a set of new value blocks, where the set of new key blocks is generated based on a set of existing key blocks of the sequence of kvsets, and where the set of new value blocks is generated based on a set of existing value blocks of the sequence of kvsets. For example, the set of new key blocks may be generated based on the set of existing key blocks of the sequence of kvsets by copying values (e.g., key values) of the set of existing key blocks to the set of new key blocks, and causing new key blocks (in the set of new key blocks) to respectively reference new value blocks (in the set of new value blocks) that correspond to existing blocks referenced by the set of existing key blocks. The set of new value blocks may be generated based on the set of existing value blocks of the sequence of kvsets by copying values of the set of existing value blocks to the set of new value blocks. The set of new value blocks may be assigned (e.g., inherit) the largest (e.g., maximum) data generation number assigned to any value block in the set of existing value blocks.

Additionally, for some embodiments, in response to determining that the set of child nodes comprises at least one leaf node and at least one non-leaf node (e.g., the KVS tree is unbalanced and, thus, the set of child nodes can comprise a mix of leaf and non-leaf nodes), the key merge move operation can merge a sequence of kvsets of the node to produce a first merged kvset and a second merged kvset. For some such embodiments, the first merged kvset comprises a first set of new key blocks that reference a set of existing value blocks of the sequence of kvsets, where key(s) within the first set of new key blocks map (e.g., based on deterministic mapping) to one or more non-leaf nodes, and the second merged kvset comprises a second set of new key blocks that reference a set of new value blocks, where the where key(s) within the second set of new key blocks map (e.g., based on deterministic mapping) to one or more leaf nodes. As noted herein, the set of new value blocks for the second merged kvset may be assigned (e.g., inherit) the largest (e.g., maximum) data generation number assigned to any value block in the set of existing value blocks. Eventually, the first merged kvset can be split into a first set of split kvsets and distributed to one or more non-leaf nodes, the second merged kvset can be split into a second set of split kvsets and distributed to one or more leaf nodes.

After the set of new key blocks and the set of new value blocks have been generated, the key merge move operation can delete, from the node, each particular kvset in the sequence of kvsets, and delete all key blocks of each particular kvset. Additionally, after the set of new key blocks and the set of new value blocks have been generated, one or more existing value blocks (e.g., all existing value blocks) of the sequence of kvsets may be deleted based on their individual data generation numbers. As noted herein, the individual data generation numbers of value blocks may be assigned to the blocks at initial creation (e.g., when added to the root node of the KVS tree) or, possibly, inherited from another operation of the KVS tree. According to some embodiments, deleting an existing value block (e.g., referenced by an entry in an existing key block of the particular kvset) based on data generation numbers may comprise: determining a set of largest data generation numbers by determining, for each particular leaf node of the key-value store tree data structure, a largest data generation number assigned to any value block associated with (e.g., included by a kvset of) the particular leaf node; determining a smallest data generation number in the set of largest data generation numbers: and deleting the value block if it has a particular data generation number that is less than the smallest data generation number. The foregoing operations may be collectively referred to herein as a key-value compaction (kv-compaction), which may be regarded as a form of garbage collection to remove obsolete key blocks and value blocks and free resources (e.g., media blocks of a data storage media) occupied by those obsolete key blocks and value blocks.

Subsequent to the merger of the sequence of kvsets, the key merge move operation can partition the merged kvset into a set of split kvsets, where each split kvset is meant for a different child node in the set of child nodes. For example, the merged kvset may be partitioned based on the determinative mapping of the key blocks of the merged kvset to one or more child nodes of the node. Accordingly, the merged kvset may be partitioned such that a split kvset is generated for each child node that is to receive (e.g., to add) a kvset comprising one or more key blocks from the merged kvset, and such that the split kvset assigned (e.g., to be added to) a given child node will comprise only key blocks that map to the given child node based on the determinative mapping (e.g., mapping value described herein). As such, depending on key blocks included by the merged kvset, partitioning the merged kvset may result in a set of split kvsets that comprises split kvsets for less than all child nodes of the node (e.g., only one split kvset for one child node) based on the determinative mapping of the key blocks. Eventually, the key merge move operation can move the split kvsets to the one or more child nodes of the node (e.g., according to the determinative mapping). Moving a particular split kvset to a particular child node may comprise adding the split kvset to the particular child node as a new kvset of the particular child node. According to some embodiments, where all the key blocks of the merged kvset map to a single child node, the partitioning step can be skipped and the merged kvset may be moved (e.g., added) to the single child node without need for partitioning.

The assignment of the data generation number to the set of new value blocks generated for the merged kvset can be used by an embodiment during operations (e.g., garbage collection operations) to reclaim memory space (e.g., data storage media space) occupied by one or more obsolete value blocks associated with leaf nodes of the KVS tree. For example, during a garbage collection process, any value block associated with an internal node of the KVS tree may be deleted if its associated data generation number is less than a lowest (e.g., minimum) data degeneration number found in a set of largest (e.g., maximum) data generation numbers surveyed from each leaf node of the KVS tree. Accordingly, the deletion of value blocks may not be limited to when a key merge move operation merges and moves kvsets to a leaf node.

According to some embodiments, split kvsets moved (by the key merge moved operation) to one or more child nodes atomically replace, and are logically equivalent to, the merged kvset from which the split kvsets were generated. The key merge move operation may use a determinative technique for distributing the split kvsets to the one or more child nodes of the given node containing the merged kvset. The key merge move operation may use any such key distribution method such that for a given node and a given key K, the key merge move operation always writes a key-value pair (or tombstone) with key K to the same child node of that node. Example distribution method may include a radix-based key distribution method.

For some embodiments, a key merge move operation processes a key and produces a mapping value (e.g., move or spill value) corresponding to the determinative mapping for the KVS tree. For some embodiments, the key merge move operation processes both the key and a current tree-level and produces a mapping value specific to a parent or a child node for the key at that current tree-level. The determinative mapping can ensure that, given a key, an operation (e.g., search or move compaction operation) may know which child node a key-value pair will be mapped to without regard to the KVS tree's contents.

Disclosed herein are some examples of systems that perform operations relating to key merge move as described herein.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative- or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The host system 120 includes a key merge move component 122 for key-value store (KVS) tree that can be used to perform a key merge move operation as described herein with respect to a KVS tree stored on data storage media (e.g., media pool) implemented by one or more of the memory components 112A to 112N. The KVS tree stored on the data storage media may be one generated by the host system 120, by the memory sub-system 110 (e.g., by the memory sub-system controller 115 at the request of the host system 120), or some combination thereof. Depending on the embodiment, the key merge move component 122 may be part of an application or an operating system (e.g., operating system software driver for the memory sub-system 110) on the host system 120. In some embodiments, the memory sub-system 110 includes at least a portion of the key merge move component 122. For example, the memory sub-system controller 115 can include a processor 117 (e.g., a processing device) configured to execute instructions stored in local memory 119 for performing the operations described herein. As noted herein, the key merge move operation can merge kvsets within a given node of the KVS tree by merging key blocks of the kvsets while deferring rewrite of value blocks of the kvsets, and traverse the KVS tree to place portions of the resultant merged kvset into one or more child nodes of the KVS tree.

The key merge move component 122 may perform the key merge move operation in response to detecting a condition (e.g., triggering condition), which may include a condition relating to one or more kvsets in a given node meeting specified or computed criteria. Examples of such kvset-related criteria comprise, without limitation, the number of kvsets within a given node, the addition (e.g., ingestion) of a new kvset by the given node (e.g., as a result of moving a kvset from a parent node of the given node to the given node), the freeing of resources (e.g., media blocks) with respect to the given node, the total size of one or more kvsets within the given node, or the amount of data in the one or more kvsets available for garbage collection. Other examples of conditions comprise, without limitation, receiving a request (e.g., from software application or an operating system of a host system) to initiate a key merge move operation with respect to one or more nodes of the KVS tree, where the request may also specify whether entire sequence of kvsets or a subsequence of kvsets will be operated upon.

Depending on the embodiment, the key merge move component 122 may comprise logic (e.g., a set of machine instructions, such as firmware) or one or more components that causes the memory sub-system 110 (e.g., the memory sub-system controller 115) to perform operations described herein with respect to the key merge move component 122. The key merge move component 122 may comprise a tangible unit capable of performing operations described herein. Further details with regards to the operations of the key merge move component 122 are described below.

Figure 2:
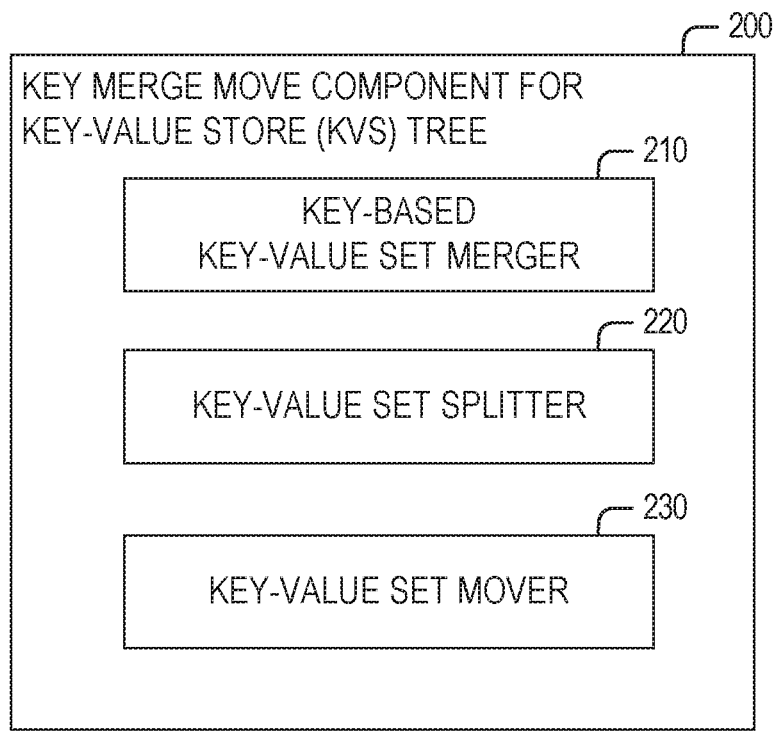
FIG. 2 is a block diagram of an example key merge move for key-value store (KVS) tree, in accordance with some implementations of the present disclosure.

FIG. 2 is a block diagram of an example key merge move component for KVS tree 200 (hereafter, the key merge move component 200), in accordance with some implementations of the present disclosure. As illustrated, the key merge move component 200 comprises a key-based key-value set merger 210, a key-value set splitter 220, and a key-value set mover 230. For some embodiments, the key merge move component 200 may differ in components or arrangement (e.g., less or more components) than what is illustrated in FIG. 2.

As noted herein, the KVS tree operated upon by the key merge move component 200 may be stored on a memory sub-system (e.g., 110) to facilitate storage of data (e.g., user data) as key-value pairs. The KVS tree may be part of a plurality of KVS trees that form a key-value store (KVS) database, which may comprise a multilevel tree with a base level comprising heterogeneous kvsets and a second level comprising the root nodes (and thus the start) of two or more KVS subtrees that each respectively comprise homogeneous kvsets. The KVS tree may be generated by a host system (e.g., 110), a memory sub-system (e.g., 110), or some combination thereof. The KVS tree may be generated, on a set of memory components, such that the KVS tree comprises a set of nodes, where a node in the set of nodes comprises a sequence of kvsets, and where a kvset in the sequence of kvsets comprises a set of key blocks for storing one or more keys and a set of value blocks for storing one or more values. The sequence of kvsets may be temporally ordered such that kvsets added earlier in the sequence represent older data (e.g., key-value pairs) relative to kvsets recently added.

The key-based key-value set merger 210 merges (e.g., compacts) a sequence of kvsets of the given node, based on whether a set of child nodes of the given node comprises a leaf node, to generate a merged kvset. Accordingly, once a key merge move has been initiated by the key merge move component 200 with respect to the given node (e.g., triggered by the key merge move component 200 based on satisfaction of a condition for merging (e.g., compacting) and moving (e.g., spilling) the sequence of kvsets from the given node to one of its child nodes), the key-based key-value set merger 210 (or some other component internal or external to the key merge move component 200) may determine whether the set of child of nodes of the given node comprises a leaf node.

In response to determining that the set of child nodes does not comprise a leaf node (e.g., none of child nodes in the set are leaf nodes), the key-based key-value set merger 210 can merge the sequence of kvsets of the node to produce a merged kvset, where the resulting merged kvset comprises a set of new key blocks that reference a set of existing value blocks (e.g., previously generated value blocks) of the sequence of kvsets. For example, as noted herein, the set of new key blocks may be generated by copying values (e.g., key values and references to existing value blocks) of the set of existing key blocks to the set of new key blocks. Those existing value blocks of the sequence of kvsets that are not referenced by the set of new key-value blocks are retained (e.g., not deleted) but are considered unreferenced and may be shared by two key blocks of different kvsets (e.g., two kvsets of internal node of the KVS tree). After the set of new key blocks has been generated, the key merge move operation can delete, from the node, each particular key-value set in the sequence of key-value sets, and delete all key blocks of each particular key-value set while leaving all value blocks of each particular key-value set (e.g., preserved as-is). The preserved value blocks can comprise value blocks referenced by the set of new key blocks, value blocks not referenced by any of the set of new key blocks, or both. All value blocks of the sequence of kvsets (which are preserved as-is) can be moved to the merged kvset.

Alternatively, in response to determining that the set of child nodes only comprises one or more leaf nodes, the key-based key-value set merger 210 can merge a sequence of kvsets of the given node to produce a merged kvset such that the resulting merged kvset comprises a set of new key blocks that references a set of new value blocks, where the new key blocks are generated based on a set of existing key blocks of the sequence of kvsets, and where the set of new value blocks is generated based on a set of existing value blocks of the sequence of kvsets. For example, as noted herein, the set of new key blocks may be generated based on the set of existing key blocks of the sequence of kvsets by copying values (e.g., key values) of the set of existing key blocks to the set of new key blocks, and causing new key blocks (in the set of new key blocks) to respectively reference new value blocks (in the set of new value blocks) that correspond to existing blocks referenced by the set of existing key blocks. The set of new value blocks may be assigned (e.g., inherit) the largest (e.g., maximum) data generation number assigned to any value block in the set of existing value blocks.

Additionally, in response to determining that the set of child nodes comprises at least one leaf node and at least one non-leaf node (e.g., the KVS tree is unbalanced and, thus, the set of child nodes can comprise a mix of leaf and non-leaf nodes), the key-based key-value set merger 210 can merge a sequence of kvsets of the node to produce a first merged kvset and a second merged kvset. For some such embodiments, the first merged kvset comprises a first set of new key blocks that reference a set of existing value blocks of the sequence of kvsets, where key(s) within the first set of new key blocks map (e.g., based on deterministic mapping) to one or more non-leaf nodes, and the second merged kvset comprises a second set of new key blocks that reference a set of new value blocks, where the where key(s) within the second set of new key blocks map (e.g., based on deterministic mapping) to one or more leaf nodes. As noted herein, the set of new value blocks for the second merged kvset may be assigned (e.g., inherit) the largest (e.g., maximum) data generation number assigned to any value block in the set of existing value blocks.

After the set of new key blocks and the set of new value blocks have been generated, for some embodiments, the key-based key-value set merger 210 deletes, from the given node, each particular kvset in the sequence of kvsets, which comprises deleting all key blocks (e.g., all existing values blocks) of the particular kvset, and which further comprises deleting value blocks (e.g., one or more existing value blocks referenced by entries in an existing key block of the particular kvset) based on their individual data generation numbers. With respect to deleting values blocks, the key-based key-value set merger 210 may delete value blocks based on their individual data generation numbers by: determining a set of largest data generation numbers by determining, for each particular leaf node of the key-value store tree data structure, a largest data generation number assigned to any value block associated with (e.g., included by a kvset of) the particular leaf node; determining a smallest data generation number in the set of largest data generation numbers: and deleting the value block if it has a particular data generation number that is less than the smallest data generation number. Depending on the embodiment, the key-based key-value set merger 210 may determine the set of largest data generation numbers only once when deleting a given sequence of kvsets.

The key-value set splitter 220 partitions the merged kvset (generated by the key-based key-value set merger 210) into a set of split kvsets, where each split kvset is meant for a different child node in the set of child nodes. As noted herein, the merged kvset may be partitioned based on the determinative mapping of the key blocks (e.g., radix-based key distribution of key blocks) of the merged kvset to one or more child nodes of the node. Accordingly, the key-value set splitter 220 may partition the merged kvset such that a split kvset is generated for each child node that is to receive (e.g., to add) a kvset that comprises one or more key blocks from the merged kvset, and such that the split kvset assigned to (e.g., to be added to) a given child node will comprise only key blocks that map to the given child node based on the determinative mapping. For example, the key-value set splitter 220 can process the key of a particular key block from the merged kvset and a current tree-level of the given node and produce a mapping value (e.g., move or spill value) specific to one of the child nodes (of the given node) for the key at that current tree-level. Accordingly, using the mapping value, the key-value set splitter 220 can determine which split kvsets (each corresponding to a different child node) receive which key blocks from the merged kvset. For some embodiments, where the key-based key-value set merger 210 generates a first merged kvset intended for non-leaf nodes, and a second merged kvset intended for leaf nodes, the key-value set splitter 220 partitions the first merged kvsets into a first set of split kvsets and the second merged kvsets into a second set of split kvets, where each split kvset is meant for a different child node in the set of child nodes.

The key-value set mover 230 moves (e.g., spills) each split kvset in the set of split kvsets (generated by the key-value set splitter 220) to its corresponding child node, of the given node, according to the determinative mapping of key blocks. This may similarly to when the key-value set splitter 220 generates a first set of split kvsets and a second set of split kvsets as described above. For some embodiments, moving a given split kvset, from the set of split kvsets, to its corresponding child node comprises adding the given split kvset to the corresponding child node (e.g., to the child node's sequence of kvsets) as a new kvset.

As noted herein, for some embodiments, where all key blocks of the merged kvset map to one child node of the node, the partitioning of the merged kvset by the key-value set splitter 220 is skipped and the key-value set mover 230 moves the merged kvset to the one child node based on the determinative mapping of the KVS tree.

Figure 3:
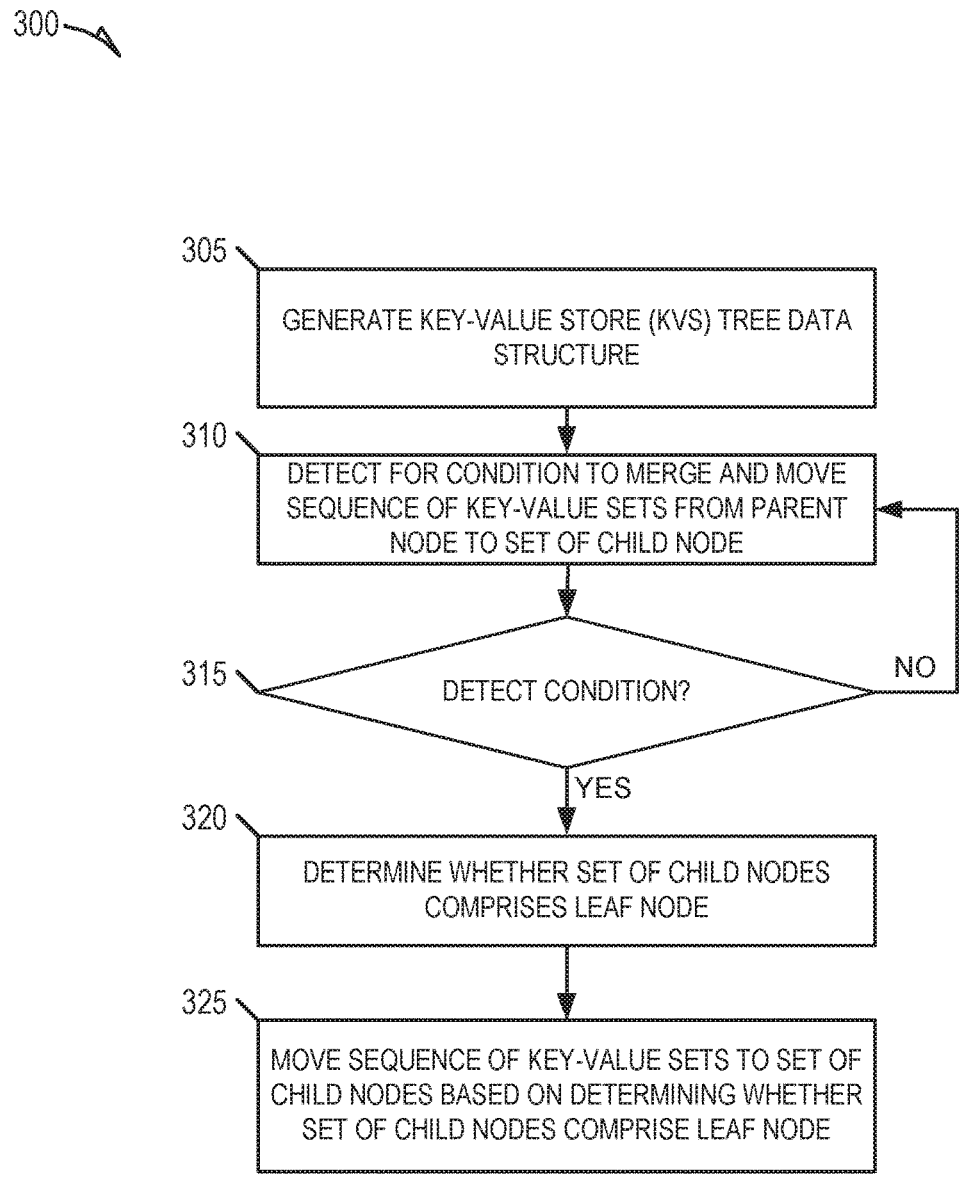
FIGS. 3 through 5 are a flow diagrams of example methods for key merge move, in accordance with some implementations of the present disclosure.
Figure 4:
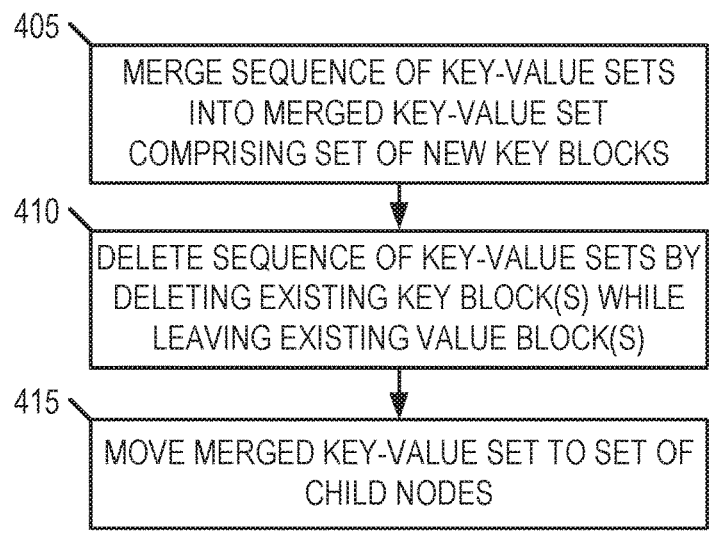
Figure 5:
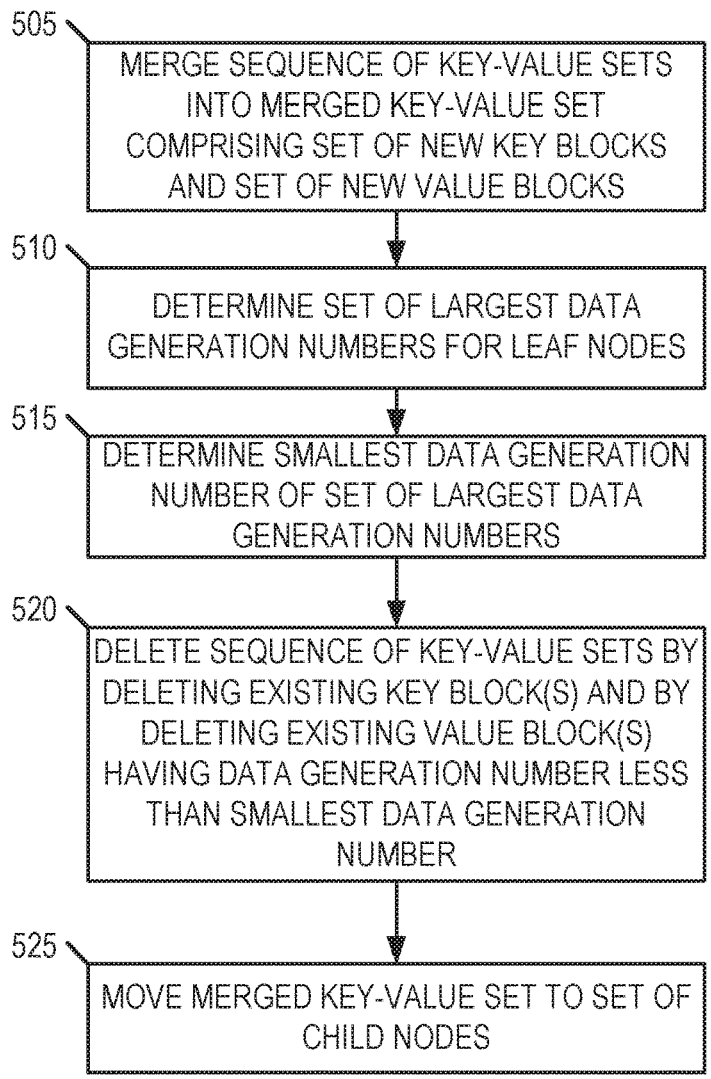

FIGS. 3 through 5 are flow diagrams of example methods for key merge move, in accordance with some implementations of the present disclosure. Any of methods 300, 400, 500 of FIGS. 3 through 5 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, one or more methods 300, 400, 500 of FIG. 3 through 5 are performed by the host system 120 of FIG. 1. In these embodiments, the methods 300, 400, 500 may be performed, at least in part, by the key merge move component 122. Alternatively, one or more methods of FIG. 3 through 5 are performed by the memory sub-system 110 of FIG. 1 (e.g., the processor of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the methods 300, 400, 500 of FIGS. 3-5 may be concurrently performed with respect to two or more nodes of the KVS tree.

Referring now to the method 300 of FIG. 3, at operation 305, a processing device of a host system (e.g., 120) generates, on a memory sub-system (e.g., 110), a key-value store tree data structure (KVS tree) that comprises a set of nodes, where each node comprises a sequence of key-value sets (kvsets), and a kvset in the sequence of kvsets comprising a set of key blocks for storing one or more keys and a set of value blocks for storing one or more values. Alternatively, the KVS tree may be already generated (e.g., by another process) and, for some embodiments, the KVS tree is accessed at operation 305, where accessing the KVS tree can assist in subsequent operations of method 300 (e.g., operation 310).

At operation 310, the processing device of the host system detects for a condition (e.g., trigger condition) to merge and move the sequence of kvsets from a given node to a set of child nodes of the given node. As noted herein, example conditions can include, without limitation, conditions that relate to the given node meeting specified or computed kvset-related criteria, such as the number of kvsets within the given node, the addition (e.g., ingestion) of a new kvset by the given node, the freeing of resources (e.g., media blocks) with respect to the given node, the total size of one or more kvsets within the given node, or the amount of data in the one or more kvsets available for garbage collection. At operation 315, if the processing device of the host system detects (at operation 310) a condition to merge and move the sequence of kvsets from the given node to a set of child nodes of the given node, the method 300 proceeds to operation 320; otherwise the method 300 returns to operation 310. At operation 320, the processing device of the host system determines whether the set of child nodes of the given node comprises a leaf node. In some embodiments, the KVS tree is structured such that if one child node of the given node comprises a leaf node, all the child nodes of the given node comprise leaf nodes.

At operation 325, the processing device of the host system moves the sequence of kvsets to the set of child nodes based on operation 320's determination of whether the set of child nodes comprises a leaf node. For some embodiments, moving the sequence of kvsets to the set of child nodes based on the determination of whether the set of child nodes comprises a leaf node comprises the processing device of the host system performing the method 400 of FIG. 4 in response to determining (at operation 320) that the set of child nodes does not comprise a leaf, and the processing device of the host system performing the method 500 of FIG. 5 in response to determining (at operation 320) that the set of child nodes does comprise a leaf.

Referring now to the method 400 of FIG. 4, at operation 405, the processing device of the host system merges the sequence of kvsets to produce a merged kvset that comprises a set of new key blocks that reference a set of existing value blocks of the sequence of kvsets, where the set of new key blocks is generated based on a set of existing key blocks of the sequence of kvsets. As noted herein, keys within this set of new key blocks may map (e.g., based on deterministic mapping) to one or more non-leaf nodes of the given node. For some embodiments, the set of new key blocks is generated based on the set of existing key blocks of the sequence of kvsets by copying values (e.g., key values and references to existing values blocks) of the set of existing key blocks to the set of new value blocks, thereby resulting in the set of new key blocks comprising the same references to the set of existing value blocks as the set of existing key blocks. Additionally, for some embodiments, all existing value blocks of the sequence of kvsets (which are preserved as-is at operation 410) are moved to the merged kvset.

At operation 410, the processing device of the host system deletes, from the given node, each particular kvset in the sequence of kvsets by deleting all key blocks of the particular kvset while leaving all value blocks (e.g., existing value blocks) of the particular kvset as-is. As noted herein, the value blocks of the particular kvset can include those referenced by the set of new key blocks, those not referenced by the set of new key blocks, or a combination of both.

At operation 415, the processing device of the host system moves (e.g., spills) the merged kvset (generated at operation 405) into the set of child nodes of the given node. For some embodiments, moving the merged kvset into the set of child nodes comprises first partitioning the merged kvset into a set of split kvsets, where each split kvset is assigned to a different child node (in the set of child nodes) that is to receive a portion of the merged kvset based on the determinative mapping of the KVS tree (e.g., mapping value described herein). As noted herein, depending on key blocks included by the merged kvset, partitioning the merged kvset may result in a set of split kvsets that comprises split kvsets for less than all child nodes of the given node (e.g., only one split kvset for one child node) based on the determinative mapping of the key blocks. Eventually, the processing device of the host system moves each split kvset, in the set of split kvsets, to an assigned child node in the set of child nodes. For some embodiments, moving a particular split kvsets to a particular child node may comprise adding the split kvset to the particular child node as a new kvset of the particular child node. According to some embodiments, where all the key blocks of the merged kvset map to a single child node, the partitioning operation can be skipped and the merged kvset may be moved (e.g., added) to the single child node without need for partitioning.

Referring now to the method 500 of FIG. 5, at operation 505, the processing device of the host system merge the sequence of kvsets to produce a merged kvset that comprises a set of new key blocks that reference a set of new value blocks, where the set of new key blocks is generated based on a set of existing key blocks of the sequence of kvsets, and the set of new value blocks is generated based on a set of existing value blocks of the sequence of kvsets. As noted herein, keys within this set of new key blocks may map (e.g., based on deterministic mapping) to one or more leaf nodes of the given node. For some embodiments, the set of new value blocks is generated based on the set of existing value blocks of the sequence of kvsets by copying values of the set of existing value blocks to the set of new value blocks. Additionally, for some embodiments, the set of new value blocks is assigned the largest data generation number assigned to any value block in the set of existing value blocks. With respect to the set of new key blocks, according to some embodiments, the set of new key blocks is generated based on the set of existing key blocks of the sequence of kvsets by copying values (e.g., key values) of the set of existing key blocks to the set of new key blocks, and by causing new key blocks (in the set of new key blocks) to respectively reference new value blocks (in the set of new value blocks) that correspond to existing blocks referenced by the set of existing key blocks. In this way, the set of new key blocks can comprise the same data content (e.g., keys) as the set of existing key blocks while referencing new value blocks that correspond to the set of existing key blocks.

At operation 510, the processing device of the host system determines a set of largest data generation numbers (for leaf nodes of the KVS tree) by determining, for each particular leaf node of the KVS tree, a largest data generation number assigned to any value block associated with the particular leaf node. At operation 515, the processing device of the host system determines a smallest data generation number in the set of largest data generation numbers determined at operation 510.

At operation 520, the processing device of the host system deletes, from the given node, the sequence of kvsets by deleting existing key block(s) of the sequence of kvsets, and by deleting existing value block(s) of the sequence of kvsets that have a data generation number that is less than the smallest data generation number determined by at operation 515. In doing so, those existing value block(s) of the sequence of kvsets that have a data generation number that is not less than the smallest data generation number (determined at operation 515) may be left as-is, and may represent existing value block(s) that are still referenced by (e.g., shared with) at least one kvset that still exists within the KVS tree. Those existing value block(s) that are left as-is may eventually be deleted in a future operation of the KVS tree (e.g., future execution of a key merge move). For some embodiments, the deletion of existing key blocks and existing value blocks of the sequence of kvsets are performed as part of an operation (e.g., performed at operation 515) that deletes each kvset included by the sequence of kvsets.

At operation 525, the processing device of the host system moves (e.g., spills) the merged kvset (generated at operation 505) into the set of child nodes of the given node. For various embodiments, operation 525 is similar to operation 415 described above with respect to the method 400 of FIG. 4.

Figure 6:
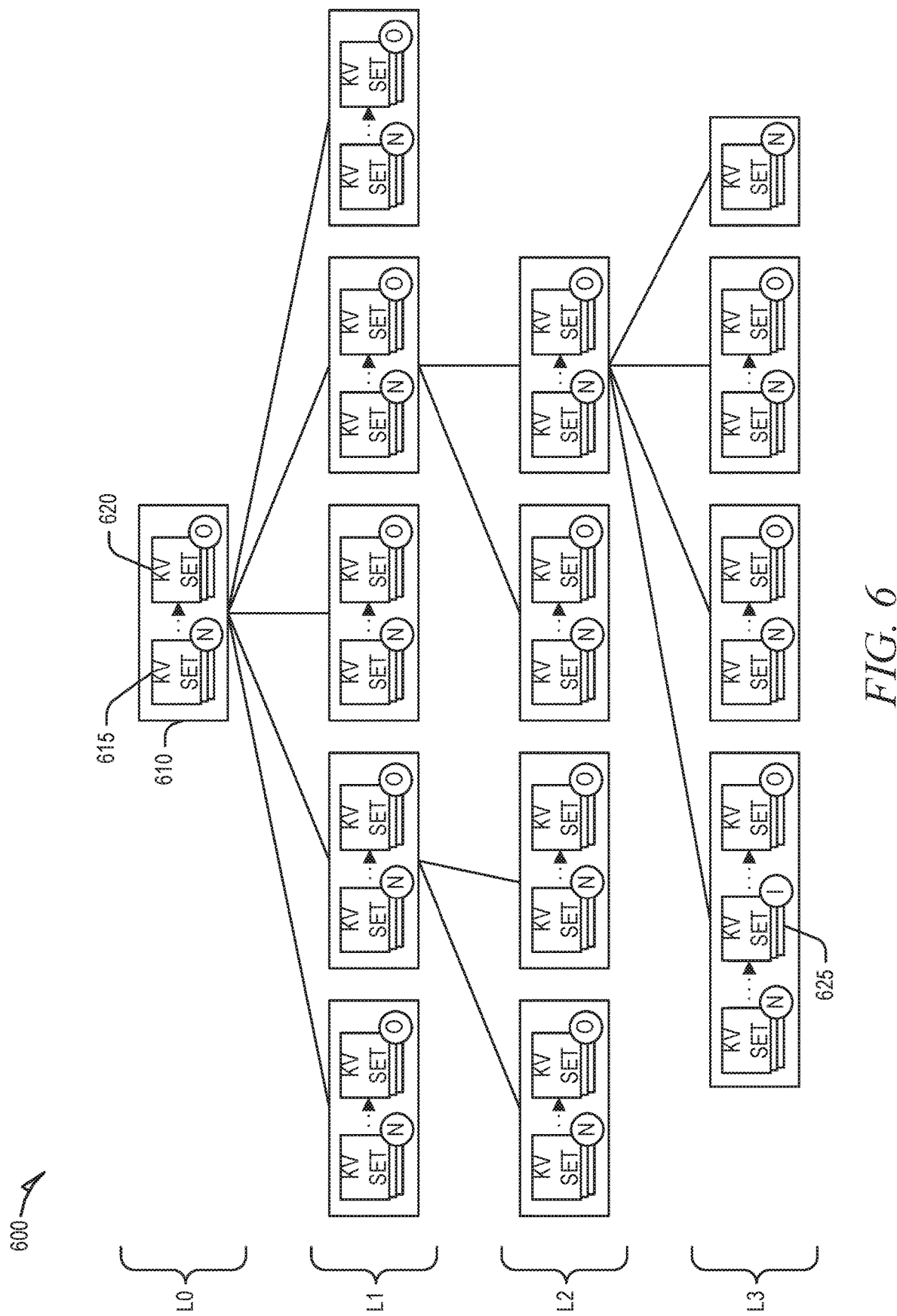
FIG. 6 is block diagram illustrating an example KVS tree that may be operated upon by a key merge move, in accordance with some implementations of the present disclosure.

FIG. 6 is block diagram illustrating an example KVS tree 600 that may be operated upon by a key merge move, in accordance with some implementations of the present disclosure. As noted herein, the KVS tree 600 comprises a key-value data structure that is organized as a tree. As a key-value data structure, values are stored in the KVS tree 600 with corresponding keys that reference the values. Specifically, key-entries may be used to contain both the key and additional information, such as a reference to the value. Keys themselves may have a total ordering within the KVS tree 600 and, as such, keys may be sorted amongst each other. Keys may also be divided into sub-keys, where the sub-keys are non-overlapping portions of a key. For some embodiments, the total ordering of keys is based on comparing like sub-keys between multiple keys (e.g., a first sub-key of a key is compared to the first sub-key of another key). Additionally, for some embodiments, a key prefix comprises a beginning portion of a key. When used, a key prefix may be composed of one or more sub-keys.

The KVS tree 600 comprises one or more nodes, such as node 610, each of which include one or more key-value sets (kvsets). For some embodiments, one or more nodes (such as the node 610) each comprises a temporally ordered sequence of kvsets. As illustrated, kvset 615 comprises an 'N' badge to indicate that it is the newest of the sequence while kvset 620 comprises an 'O' badge to indicate that it is the oldest of the sequence. Kvset 625 comprises an 'I' badge to indicate that it is intermediate in the sequence. These badges are used throughout to label kvsets; however, another badge (such as an 'X') denotes a specific kvset rather than its position in a sequence (e.g., new, intermediate, old, etc.), unless it is a tilde '~', in which case it is simply an anonymous kvset. As is explained in greater detail below, older kvsets (with older key blocks) occur lower in the KVS tree 600. Thus, pushing (e.g., spilling) kvsets down a tree-level, such as from L1 to L2, results in at least one new kvset, from a parent node, to be added to the newest position in a recipient child node of the parent node.

The KVS tree 600 comprises a determinative mapping for a key-value pair (stored by a key block and a value block) in a kvset of a given node (e.g., the node 610) to any one child node of the given node (e.g., any one of the child nodes of the node 610, which are represented by all the nodes at L1). The determinative mapping of the KVS tree 600 can mean that, given a key, an external entity could trace a path through nodes of the KVS tree 600 to a key block and a value block (of a key-value pair) for the key without knowing the contents of the KVS tree 600. This, for example, is different than a B-tree, for example, where the contents of the tree will determine where a given key's value will fall in order to maintain the search-optimized structure of the tree. In contrast, the determinative mapping of the KVS tree 600 can provide a rule such that, for example, given a key, one may calculate the child node at L3 the key would map to even if the maximum tree-level (e.g., tree depth) is only at L1 at the moment. For some embodiments, the determinative mapping comprises a portion of a hash of a portion of the key. A sub-key may be hashed to arrive at a mapping set, and a portion of the mapping set may be used for any given level of the tree. Depending on the embodiment, the portion of the key may comprise the entire key.

For some embodiments, the hash comprises a multiple of non-overlapping portions including the portion of the hash. For instance, each of the multiple of non-overlapping portions may correspond to a level of the tree. The portion of the hash may be determined from the multiple of non-overlapping portions by a level of the node. Accordingly, a maximum number of child nodes for the node may be defined by a size of the portion of the hash, where the size of the portion of the hash may be a certain number of bits. For example, with respect to a hash of a key that results in eight bits, the eight bits may be divided into three sets comprising the first two bits, bits three through six, and bits seven and eight. Child nodes may be indexed based on the set of bits, such that child nodes at the first level (e.g., L1) have two bit names (based on bits one and two), child nodes on the second level (e.g., L2) have four-bit names (based on bits three through six), and child nodes on the third level (e.g., L3) have two bit names (based on bits seven and eight).

For some embodiments, the node 610 represents a root node of the KVS tree 600. The KVS tree 600 may be stored on data storage media implemented by a memory sub-system (e.g., 110), where the KVS tree 600 may be stored in media blocks of the data storage media. The media blocks of the data storage media may be block addressable.

Figure 7A:
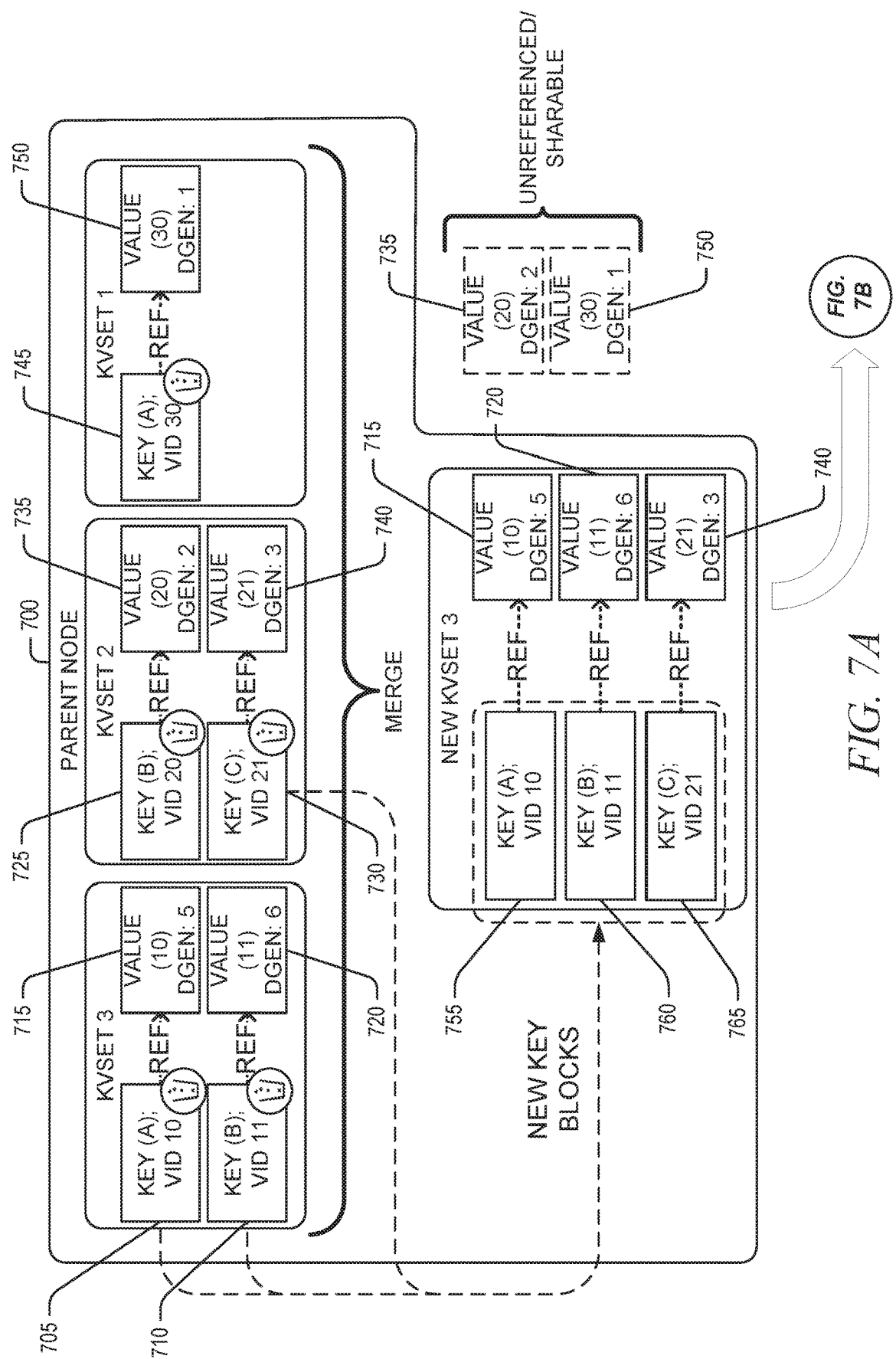
FIGS. 7A and 7B are block diagrams illustrating an example key merge move performed on one or more key-value sets when a set of child nodes does not comprise a leaf node, in accordance with some implementations of the present disclosure.
Figure 7B:
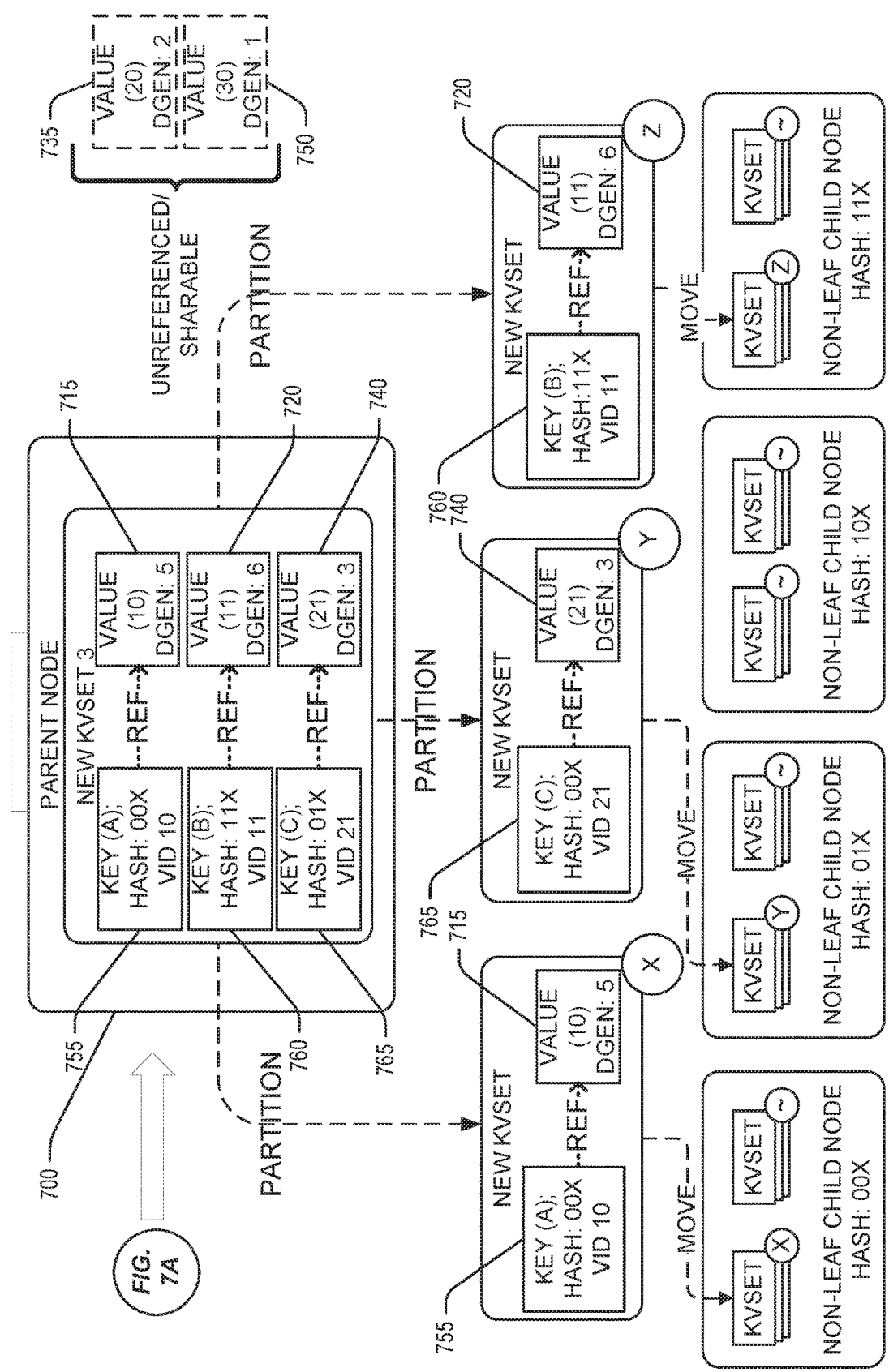

FIGS. 7A and 7B are block diagrams illustrating an example key merge move performed on one or more key-value sets when a set of child nodes does not comprise a leaf node, in accordance with some implementations of the present disclosure. In particular, FIG. 7A illustrates, with respect to a parent node 700, reading and merging of one or more existing key blocks of a sequence of kvsets (while not reading the existing value blocks of the sequence of kvsets), writing the resulting merged key blocks into a new kvset (the merged kvset) as one or more new key blocks, deleting the existing key blocks, and deleting the kvsets in the sequence of kvsets, while leaving the existing value blocks as-is. FIG. 7B continues with a tree traversal to one or more child nodes of the parent node 700 to move (e.g., spill) one or more portions of the merged (e.g., compacted) kvset into the one or more child nodes. For some embodiments, the operation of FIGS. 7A and 7B illustrates an example key compaction operation followed by an example spill operation.

Referring now to FIG. 7A, the parent node 700 comprises KVSET 1, KVSET 2, and KVSET 3, which may represent a sequence of kvsets (e.g., KVSET 1 being added first, KVSET 2 being added second, and KVSET 3 being added last to the parent node 700 over time). Depending on the embodiment, KVSETs 1, 2, 3 may represent all KVSETs of the parent node 700, or may represent only a tail end of a larger sequence of kvsets within the parent node 700. The illustrated KVSETs comprise key blocks 705, 710, 725, 730, 745, 755, 760, 765 and value blocks 715, 720, 735, 740, 750. Key block 705 comprises key A and refers to value ID 10; key block 710 comprises key B and a value reference to value ID 11; key block 725 comprises key B and a value reference to value ID 20: key block 730 comprises key C and a value reference to value ID 21; key block 745 comprises key A and a value reference to value ID 30; key block 755 comprises key A and a value reference to value ID 10; key block 760 comprises key B and a value reference to value ID 11; and key block 765 comprises key C and a value reference to value ID 21. Though key blocks (e.g., 705, 710, 725, 730, 745, 755, 760, 765) are illustrated in FIGS. 7A and 7B as comprising a single key and associated reference to value ID, for some embodiments, a given key block can comprise two or more keys and their associated references to value IDs. For instance, the data content of new key blocks 755, 760, 765 may be contained within a single new key block of the KVSET 3.

Value block 715 comprises a value ID (VID) of 10 and a data generation number (DGEN) of 5; value block 720 comprises a VID of 11 and a DGEN of 6; value block 735 comprises a VID of 20 and a DGEN of 2; value block 740 comprises a VID of 21 and a DGEN of 3; and value block 750 comprises a VID of 30 and a DGEN of 1. Key blocks 705, 710, 725, 730, 745 represent existing key blocks of the sequence of kvsets, value blocks 715, 720, 735, 740, 750 represent existing value blocks of the sequence of kvsets, and key blocks 755, 760, 765 represent new key blocks generated for NEW KVSET 3.

For some embodiments, the merged kvset that results from merging a sequence of kvsets inherits the largest ordinal number associated with any kvset of the sequence of kvsets. For example, for some embodiments, individual kvsets (like value blocks) in a KVS tree may be associated with a data generation number, and the ordinal number may comprise an associated data generation number that is associated with the kvset. Accordingly, where a sequence of kvsets comprises KVSET 10, KVSET 8, KVSET 7, and KVSET 5, a merged kvset resulting from merging the sequence of kvsets may be regarded as KVSET 10, as KVSET 10 has the largest ordinal number in the sequence. Additionally, in this way, the merged kvset can be regarded as a replacement for the sequence of kvsets.

As illustrated, KVSET 3 (the newest), KVSET 2, and KVSET 1 (the oldest) are merged (e.g., compacted) into NEW KVSET 3 within the parent node 700. During the merge, NEW KVSET 3 is generated as a new kvset added to the parent node 700, and new key blocks 755, 760, 765 are generated for NEW KVSET 3 based on the merger of the existing key blocks 705, 710, 725, 730, 745. The merger of existing key blocks 705, 710, 725, 730, 745 results in a collision on key A (with respect to existing key blocks 705 and 745) and collision on key B (with respect to existing key blocks 710 and 725). According to some embodiments, a given kvset only comprises one key entry (across key blocks of the given kvset) for each key, and a key collision between a plurality of key blocks being merged may be resolved in favor of the most recent (e.g., the newest) key entry in the plurality of key blocks (e.g., most recent key entry is retained and the remainder of key entries in the plurality of key blocks are discarded). Accordingly, the collisions of keys A and B is resolved in favor of the most recent for keys A and B, which (in FIG. 7A) are stored in the leftmost key blocks for keys A and B—existing key block 705 for key A and existing key block 710 for key B. Key C has no collision and so existing key block 730 for key C will be used with respect to new NEW KVSET 3. As a result, merging the existing key blocks 705, 710, 725, 730, 745 results in key entries for keys A, B, and C stored in existing key blocks 705, 710, 730 being chosen for the merger, and new key blocks 755, 760, 765 are generated for NEW KVSET 3 based on these chosen key entries. Existing key blocks 705, 710, 725, 730, 745 are eventually deleted, as is each of the kvsets in the sequence of kvsets (i.e., KVSETs 1, 2, 3). With the deletion of KVSETs 1, 2, 3, NEW KVSET 3 replaces the KVSETs 1, 2, 3 within the parent node 700.

As shown, new key blocks 755, 760, 765 are generated based on the chosen existing key blocks 705, 710, and 730 by copying values (e.g., key values and references from entries in existing value blocks) from existing key blocks 705, 710, 730 to the new key blocks 755, 760, 765. Accordingly, new key blocks 755, 760, 765 respectively refer to VIDs 10, 11, and 21 (corresponding to existing value blocks 715, 720, 740 respectively), same as existing key blocks 705, 710, 730. In this way, new key blocks 755, 760, 765 continue to refer to existing key blocks 705, 710, 730 of the sequence of kvsets (KVSETs 1, 2, 3) with need for creating new value blocks for NEW KVSET 3. As also shown, existing key blocks 705, 710, 730 are moved to NEW KVSET 3. After the existing key blocks 705, 710, 725, 730, 745 are deleted, those existing value blocks (735, 750) of the sequence of kvsets not referenced by new value blocks of NEW KVSET 3 continue to persist, but are not moved to NEW KVSET 3 and are considered unreferenced, which is denoted in FIGS. 7A and 7B with dashed lines. As noted herein, though unreferenced by NEW KVSET 3, existing blocks 735, 750 may continue to exist and be referenced (and therefore shared by) one or more other kvsets within the KVS tree.

For some embodiments, the generation and addition of NEW KVSET 3 comprises adding NEW KVSET 3 to a newer position, within the sequence of kvsets of the parent node 700, relative to (e.g., to the left of) KVSET 3, thereby ensure that the generation and addition of NEW KVSET 3 is a non-blocking operation within the KVS tree.

Referring now to FIG. 7B, after deletion of the sequence of kvsets (KVSETs 1, 2, 3), including deletion of existing key blocks 705, 710, 725, 730, 745, NEW KVSET 3 remains within the parent node 700 with new key blocks 755, 760, 765. NEW KVSET 3 is partitioned (or split) into a set of new kvsets (also referred to herein as split kvsets) that comprises KVSETs X, Y, Z. As noted herein, for some embodiments, the KVS tree uses determinative mapping (e.g., mapping value) for distributing key entries of key blocks and value blocks (referenced by key blocks) of merged kvsets (e.g., NEW KVSET 3) from a parent node (e.g., 700) to one or more child nodes of the parent node. Accordingly, NEW KVSET 3 is partitioned according to which child nodes the key entries of new key blocks 755, 760, 765 map based on their respective mapping value. In FIG. 7B, the mapping value of a given key entry of a key block comprises a hash of the given key entry's key. As illustrated, this results in: key entry for key A (hash(key A)=00F) being included by new key block 770 in new KVSET X, which is assigned to be moved (e.g., added) to the non-leaf child node associated with (e.g., that maps to) mapping value 00F; key entry for key C (hash(key C)=00F) being included by new key block 775 in new KVSET Y, which is assigned to be moved to the non-leaf child node associated with mapping value 11C; and key entry for key B (hash(key B)=00F) being included by new key block 780 in new KVSET Z, which is assigned to be moved to the non-leaf child node associated with mapping value 0X2.

As shown in FIG. 7B, partitioning of NEW KVSET 3 did not result in a new kvset for the non-leaf node associated with mapping value 1X0, as none of the keys of NEW KVSET 3 had a mapping value of 1X0. When the KVSETs X, Y, Z are moved to their respective non-leaf child nodes, according to some embodiments, they are added as the newest kvset to those nodes (e.g., which is denoted by being placed at the left-most position within the node). As also illustrated in FIG. 7B, existing value blocks 735, 750 continue to persist as unreferenced value blocks (as denoted by dashed lines).

Figure 8A:
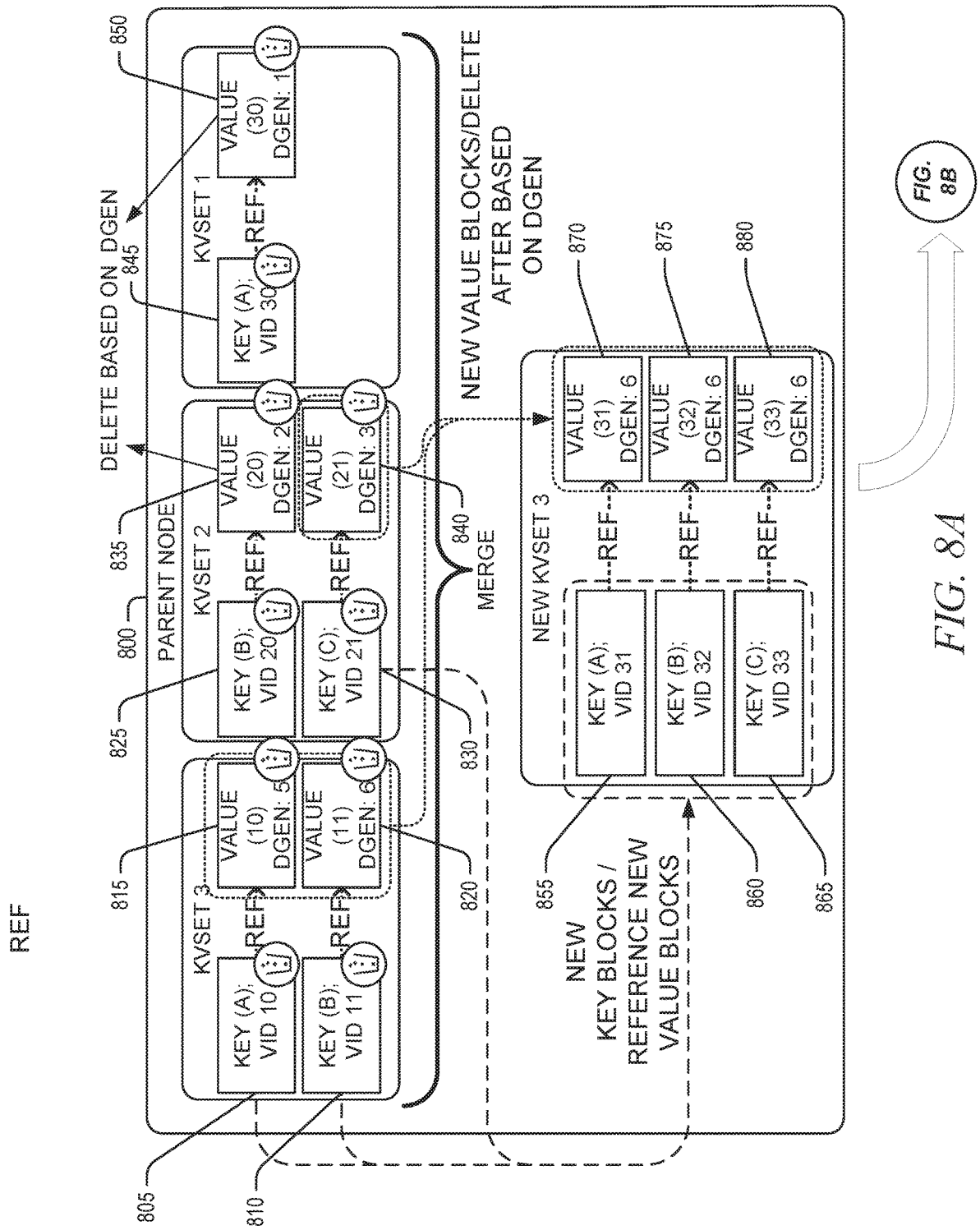
FIGS. 8A and 8B are block diagrams illustrating an example key merge move performed on one or more key-value sets when a set of child nodes only comprises one or more leaf nodes, in accordance with some implementations of the present disclosure.
Figure 8B:
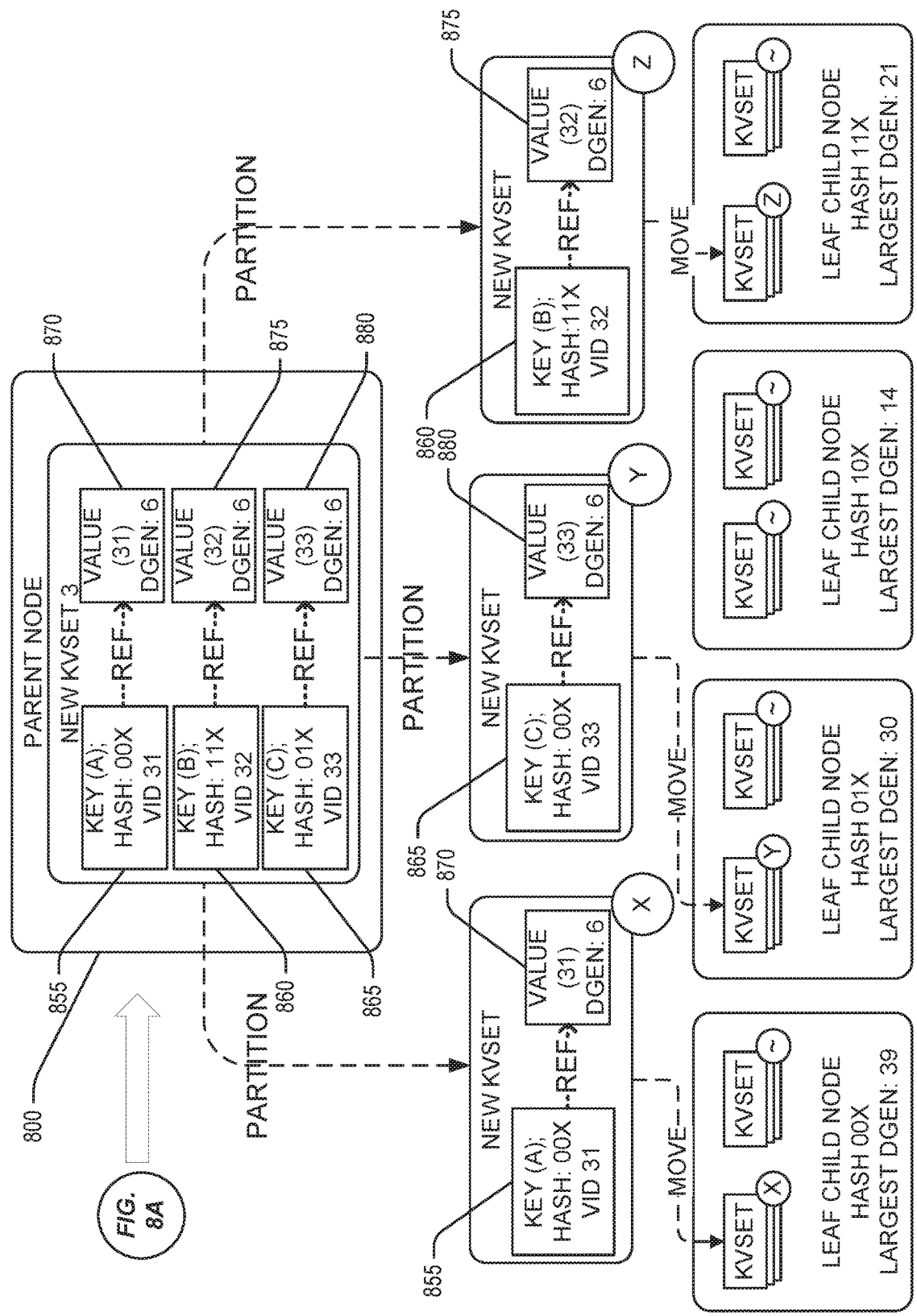

FIGS. 8A and 8B are block diagrams illustrating an example key merge move performed on one or more key-value sets when a set of child nodes only comprises one or more leaf nodes, in accordance with some implementations of the present disclosure. In particular, FIG. 8A illustrates, with respect to a parent node 800, reading and merging of one or more existing key blocks and one or more existing value blocks of a sequence of kvsets, writing the resulting merged key blocks and value blocks into a new kvset (the merged kvset) as one or more new key blocks and one or more new value blocks, deleting the existing key blocks, deleting the kvsets in the sequence of kvsets, and deleting the existing value blocks based on their respective data generation numbers. FIG. 8B continues with a tree traversal to one or more child nodes of the parent node 800 to move (e.g., spill) one or more portions of the merged (e.g., compacted) kvset into the one or more child nodes. Unlike FIGS. 7A and 7B, the child nodes of the parent node 800 are leaf child nodes. As noted herein, by generating new value blocks at the leaf node level of a KVS tree (and not at non-leaf node levels), some embodiments can avoid or defer writing value blocks when performing key merge moves between internal nodes of the KVS tree. For some embodiments, the operation of FIGS. 8A and 8B illustrate an example key-value compaction operation followed by an example spill operation.

Referring now to FIG. 8A, the parent node 800 comprises KVSET 1, KVSET 2, and KVSET 3, which may represent a sequence of kvsets (e.g., KVSET 1 being added first, KVSET 2 being added second, and KVSET 3 being added last to the parent node 800 over time). Depending on the embodiment, KVSETs 1, 2, 3 may represent all KVSETs of the parent node 800, or may represent only a tail end of a larger sequence of kvsets within the parent node 800. The illustrated KVSETs comprise key blocks 805, 810, 825, 830, 845, 855, 860, 865 and value blocks 815, 820, 835, 840, 850, 870, 875, 880. Key block 805 comprises key A and refers to value ID 10; key block 810 comprises key B and a value reference to value ID 11; key block 825 comprises key B and a value reference to value ID 20; key block 830 comprises key C and a value reference to value ID 21; key block 845 comprises key A and a value reference to value ID 30; key block 855 comprises key A and a value reference to value ID 31; key block 860 comprises key B and a value reference to value ID 32; and key block 865 comprises key C and a value reference to value ID 33. Though key blocks (e.g., 805, 810, 825, 830, 845, 855, 860, 865) are illustrated in FIGS. 8A and 8B as comprising a single key and associated reference to value ID, for some embodiments, a given key block can comprise two or more keys and their associated references to value IDs. For instance, the data content of new key blocks 855, 860, 865 may be contained within a single new key block of the KVSET 3.

Value block 815 comprises a value ID (VID) of 10 and a data generation number (DGEN) of 5; value block 820 comprises a VID of 11 and a DGEN of 6; value block 835 comprises a VID of 20 and a DGEN of 2: value block 840 comprises a VID of 21 and a DGEN of 3; value block 850 comprises a VID of 30 and a DGEN of 1: value block 870 comprises a VID of 31 and a DGEN of 6; value block 875 comprises a VID of 32 and a DGEN of 6; and value block 880 comprises a VID of 33 and a DGEN of 6.

Key blocks 805, 810, 825, 830, 845 represent existing key blocks of the sequence of kvsets, value blocks 815, 820, 835, 840, 850 represent existing value blocks of the sequence of kvsets, key blocks 855, 860, 865 represent new key blocks generated for NEW KVSET 3, and value blocks 870, 875, 880 represent new value blocks generated for NEW KVSET 3.

As illustrated, KVSET 3 (the newest), KVSET 2, and KVSET 1 (the oldest) are merged (e.g., compacted) into NEW KVSET 3 within the parent node 800. During the merge, NEW KVSET 3 is generated as a new kvset added to the parent node 800, new key blocks 855, 860, 865 are generated for NEW KVSET 3 based on the merger of the existing key blocks 805, 810, 825, 830, 845, and new value blocks 870, 875, 880 are generated for NEW KVSET 3 based on the merger of the existing value blocks 815, 820, 835, 840, 850 (in view of the merger of the existing key blocks 805, 810, 825, 830, 845). The merger of existing key blocks 805, 810, 825, 830, 845 results in a collision on key A (with respect to existing key blocks 805 and 845) and collision on key B (with respect to existing key blocks 810 and 825). As noted herein, according to some embodiments, a given kvset only comprises one key entry (across key blocks of the given kvset) for each key, and a key collision between a plurality of key blocks being merged may be resolved in favor of the most recent (e.g., the newest) key entry in the plurality of key blocks (e.g., most recent key entry is retained and the remainder of key entries in the plurality of key blocks are discarded). Accordingly, the collisions of keys A and B are resolved in favor of the most recent key blocks for keys A and B, which (in FIG. 8A) are stored in the leftmost key blocks for keys A and B—existing key block 805 for key A and existing key block 810 for key B. Key C has no collision and so existing key block 830 for key C will be used with respect to new NEW KVSET 3. As a result, merging the existing key blocks 805, 810, 825, 830, 845 results in key entries for keys A, B, and C stored in existing key blocks 805, 810, 830 being chosen for the merger, and new key blocks 855, 860, 865 are generated for NEW KVSET 3 based on these chosen key entries. Additionally, based on existing key blocks 805, 810, 830 being chosen for keys A, B, and C, the existing value blocks (815, 820, 840) corresponding to existing key blocks 805, 810, 830 are used to generate new value blocks 870, 875, 880. Existing key blocks 805, 810, 825, 830, 845, as is each kvset in the sequence of kvsets (i.e., KVETs 1, 2, 3), are eventually deleted. With the deletion of KVSETs 1, 2, 3, NEW KVSET 3 replaces the KVSETs 1, 2, 3 within the parent node 800.

As shown, new value blocks 870, 875, 880 are generated based on existing value blocks 815, 820, 840 by copying values of existing value blocks 815, 820, 840 into corresponding new value blocks 870, 875, 880. Additionally, each of new value blocks 870, 875, 880 is assigned (e.g., inherits)

the largest data generation number of any of existing value blocks 815, 820, 835, 840, 850, which in the case of FIG. 8A is 6. New key blocks 855, 860, 865 are generated based on the chosen existing key blocks 805, 810, 830 such that new key blocks 855, 860, 865 comprise the same keys as existing key blocks 805, 810, 830 respectively while referencing new value blocks 870, 875, 880 that correspond to existing value blocks 815, 820, 840. Accordingly, new key blocks 855, 860, 865 comprise value references to VIDs 31, 32, 33 respectively.

Each of existing value blocks 815, 820, 835, 840, 850 may be deleted based on their respective data generation numbers. According to some embodiments, for each leaf child node of the parent node 800, the largest data generation number of any value block included by (e.g., referenced by a kvset of) the leaf child node is determined. In FIG. 8B, this would result in a set of largest data generation numbers of {39, 30, 14, 21}. Then, according to some embodiments, a smallest data generation number included by the set of largest data generation numbers is determined. In the case of FIG. 8B, this would be 14. Subsequently, according to some embodiments, any existing key blocks having a data generation number less than the smallest data generation number determined is deleted. With respect to FIG. 8B, each of existing value blocks 815, 820, 835, 840, 850 has a data generation number (5, 6, 2, 3, 1 respectively) that is less than the smallest data generation number of 14.

For some embodiments, the generation and addition of NEW KVSET 3 comprises adding NEW KVSET 3 to a newer position, within the sequence of kvsets of the parent node 800, relative to (e.g., to the left of) KVSET 3, thereby ensuring that the generation and addition of NEW KVSET 3 is a non-blocking operation within the KVS tree.

Referring now to FIG. 8B, after deletion of the sequence of kvsets (KVSETs 1, 2, 3), including deletion of existing key blocks 805, 810, 825, 830, 845, NEW KVSET 3 remains within the parent node 800 with new key blocks 855, 860, 865, which respectively reference new value blocks 870, 875, 880. NEW KVSET 3 is partitioned (or split) into a set of new kvsets (also referred to herein as split kvsets) that comprises KVSETs X, Y, Z. As noted herein, for some embodiments, the KVS tree uses determinative mapping (e.g., mapping value) for distributing key entries of key blocks and value blocks (referenced by key blocks) of merged kvset (e.g., NEW KVSET 3) from a parent node (e.g., 800) to one or more child nodes of the parent node. Accordingly, NEW KVSET 3 is partitioned according to which child nodes the key entries of the new key blocks 855, 860, 865 map based on their respective mapping value. In FIG. 8B, the mapping value of a given key entry of a key block comprises a hash of the given key entry's key. As illustrated, this results in: key entry for key A (hash(key A)=00F) being included by new key block 870 in new KVSET X, which is assigned to be moved (e.g., added) to the non-leaf child node associated with (e.g., that maps to) mapping value 00F; key entry for key C (hash(key C)=00F) being included by new key block 875 in new KVSET Y, which is assigned to be moved to the non-leaf child node associated with mapping value 11C, and key entry for key B (hash(key B)=11C) being included by new key block 880 in new KVSET Z, which is assigned to be moved to the non-leaf child node associated with mapping value 0X2.

As shown in FIG. 8B, the partitioning of NEW KVSET 3 did not result in a new kvset for the leaf node associated with mapping value 1X0, as none of the key blocks of NEW KVSET 3 had a mapping value of 1X0. When the KVSETs X, Y, Z are moved to their respective non-leaf child nodes, according to some embodiments, they are added as the newest kvset to those nodes (e.g., which is denoted by being placed at the left-most position within the node). As also illustrated in FIG. 8B, existing value blocks 835, 850 do not continue to persist.

Figure 9B:
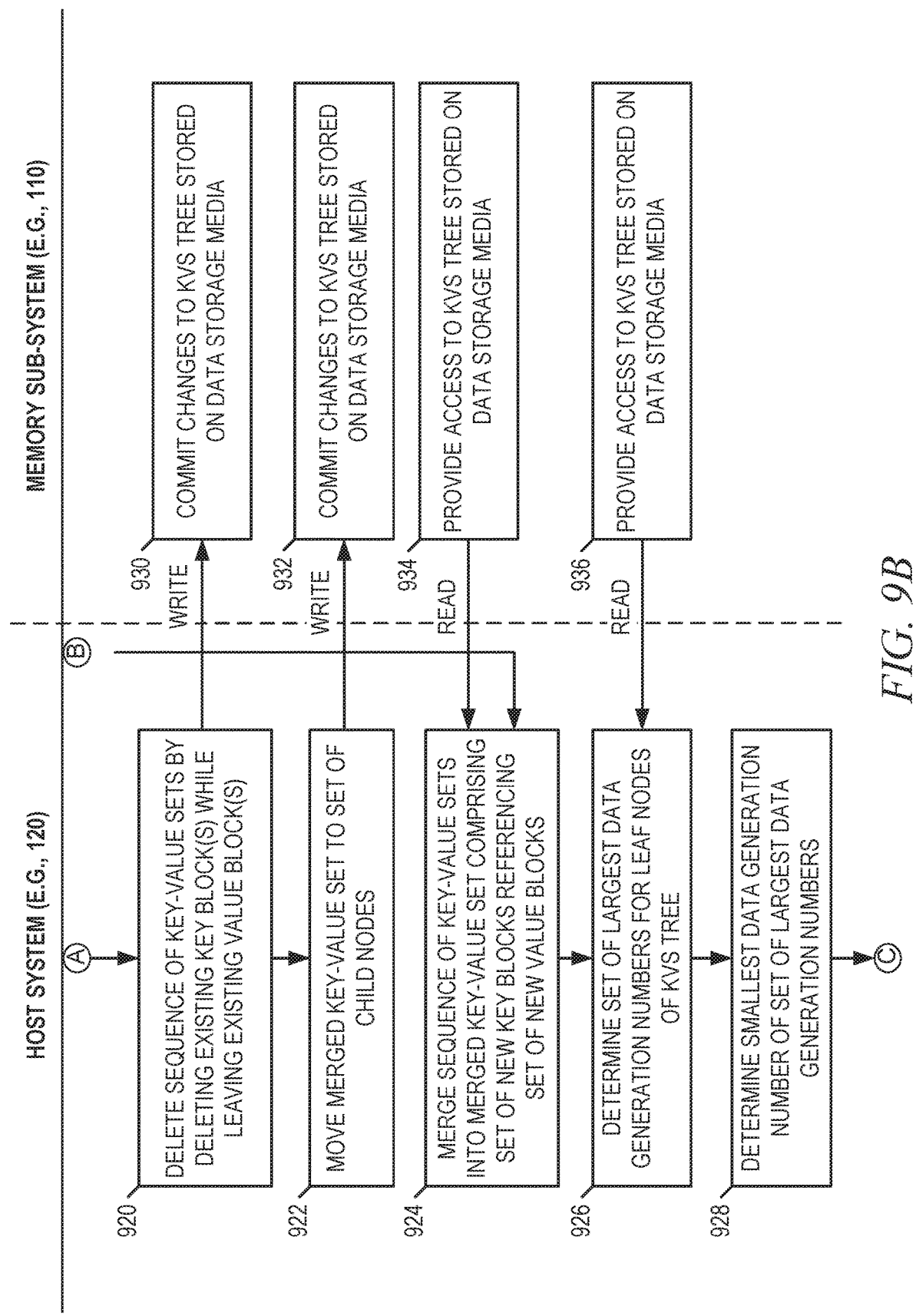
Figure 9C:
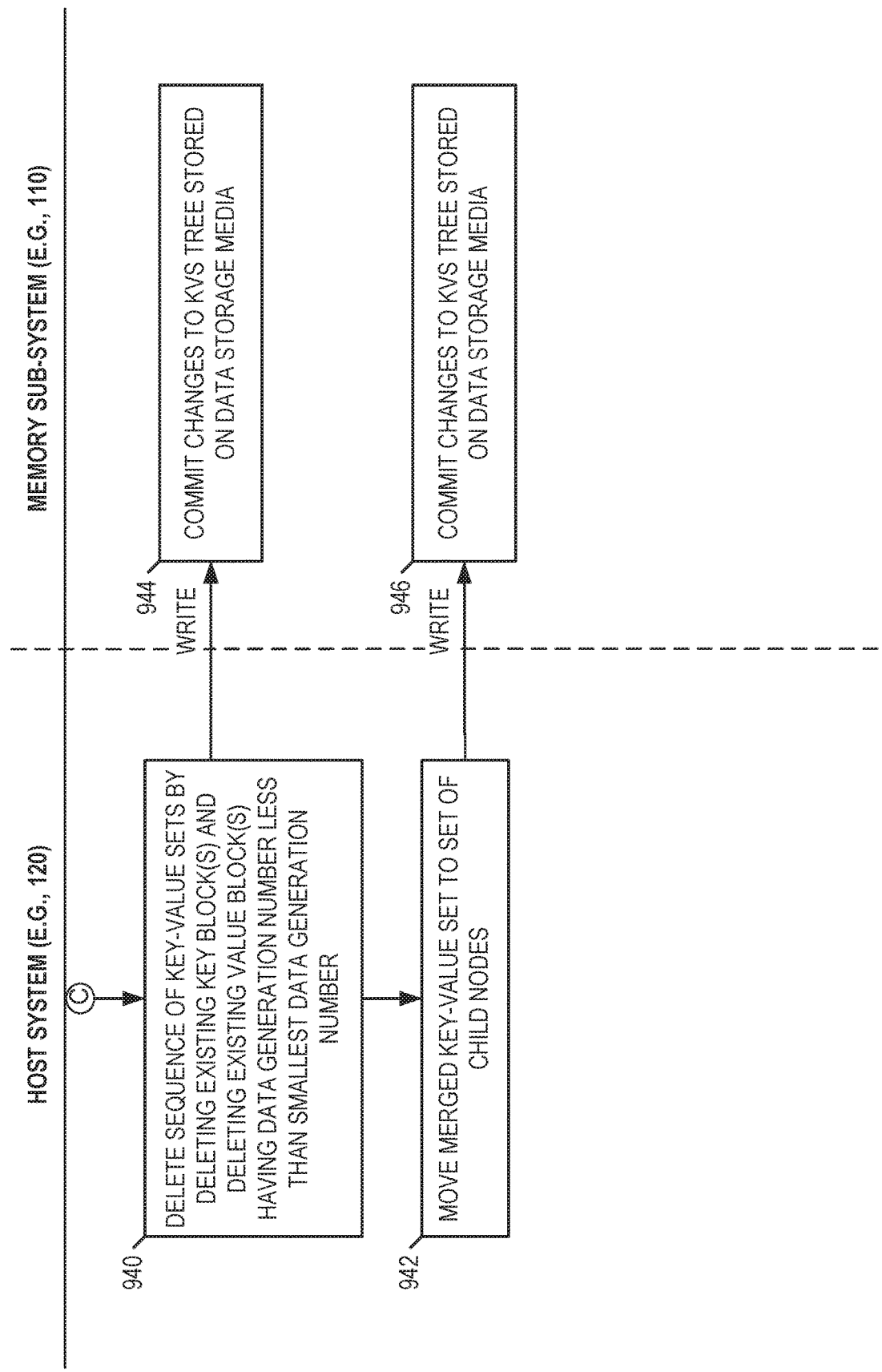

FIGS. 9A through 9C provide an interaction diagram illustrating interactions between components of the computing environment 100 in the context of an example embodiment in which a method for key merge move is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 9A through 9C, the host system can comprise the host system 120, and the memory sub-system can comprise the memory sub-system 110, where one or more of the memory components 112A to 112N can implement data storage media for storing a KVS tree operated by the host system 120.

As shown, at operation 902, the host system 120 generates a key-value store tree data structure (KVS tree), which the host system 120 writes to the memory sub-system 110 for storage. In response, at operation 910, the memory sub-system 110 stores the KVS tree on data storage media.

At operation 904, the host system 120 detects for a condition to merge and move a sequence of key-value sets of a parent node to a set of child nodes of the parent node. Upon the host system 120 detecting the condition, at operation 906, the host system 120 determines whether the set of child nodes comprises a leaf node. To do so, the host system 120 reads the KVS tree (e.g., to traverse to the parent node and the set of child nodes) stored on the data storage media of the memory sub-system 110, and the memory sub-system 110 provides access to the KVS tree at operation 912. If the host system 120 determines that set of child nodes comprises only leaf nodes, the host system 120 proceeds to operation 924 and, if the host system 120 determines that set of child nodes comprises no leaf node, the host system 120 proceeds to operation 908.

Though not illustrated, the host system 120 may determine that set of child nodes comprises at least one leaf node and at least one non-leaf node (e.g., the KVS tree is unbalanced). If the host system 120 determines that set of child nodes comprises at least one leaf node and at least one non-leaf node, as described herein, the host system 120 merge the sequence of key-value sets into a first merged key-value set for key entries that map to non-leaf nodes, and into a second merged key-value set for key entries that map to leaf nodes. Subsequently, the first merged key-value set may be operated upon by operations 920 and operations that follow from there, while the second merged key-value set may be operated upon by operations 926 and operations that follow from there.

At operation 908, the host system 120 merges the sequence of key-value sets of the parent node to produce a merged key-value set that comprises a set of new key blocks that reference a set of existing value blocks included by (e.g., referenced by a key-value set of) the sequence of key-value sets. As noted herein, the set of new key blocks is generated based on a set of existing key blocks included by (e.g., included by a key-value set of) the sequence of key-value sets. To merge the sequence of key-value sets of the parent node, the host system 120 reads the KVS tree (e.g., to read the key-value sets of the sequence) stored on the data storage media of the memory sub-system 110, and the memory sub-system 110 provides access to the KVS tree at operation 914.

After operation 908, at operation 920, the host system 120 deletes the sequence of key-value sets by deleting all existing value block(s) of the sequence of key-value sets while leaving all existing value block(s) of the sequence of key-value sets as-is. The host system 120 writes these changes to the KVS tree stored on the data storage media of the memory sub-system 110, which commits these changes to the stored KVS tree at operation 930. Subsequently, at operation 922, the host system 120 moves the merged key value set (resulting at operation 908) to the set of child nodes of the parent node. Again, the host system 120 writes these changes to the memory sub-system 110, which commits these changes to the stored KVS tree at operation 932.

At operation 924, the host system 120 merges the sequence of key-value sets of the parent node to produce a merged key-value set that comprises a set of new key blocks that reference a set of new value blocks. As noted herein, the set of new key blocks is generated based on a set of existing key blocks included by (e.g., included by a key-value set of) the sequence of key-value sets, and the set of new value blocks is generated based on a set of existing value blocks referenced by the set of existing key blocks. To merge the sequence of key-value sets of the parent node, the host system 120 reads the KVS tree stored on the data storage media of the memory sub-system 110, and the memory sub-system 110 provides access to the KVS tree at operation 934.

After operation 924, at operation 926, the host system 120 determines a set of largest data generation numbers for leaf nodes of the KVS tree. To do so, the host system 120 reads the KVS tree (e.g., to survey the leaf nodes of the KVS tree) stored on the data storage media of the memory sub-system 110, and the memory sub-system 110 provides access to the KVS tree at operation 936. At operation 928, the host system 120 determines a smallest data generation number of the set of largest data generation numbers determined at operation 926. At operation 940, the host system 120 deletes the sequence of key-value sets by deleting all existing value block(s) of the sequence of key-value sets, and deletes any existing value block(s) of the sequence of key-value sets that have a data generation number that is less than the smallest data generation number determined at operation 928. The host system 120 writes these changes to the KVS tree stored on the data storage media of the memory sub-system 110, which commits these changes to the stored KVS tree at operation 944. Subsequently, at operation 942, the host system 120 moves the merged key value set (resulting at operation 924) to the set of child nodes of the parent node. Again, the host system 120 writes these changes to the memory sub-system 110, which commits these changes to the stored KVS tree at operation 946.

Figure 10:
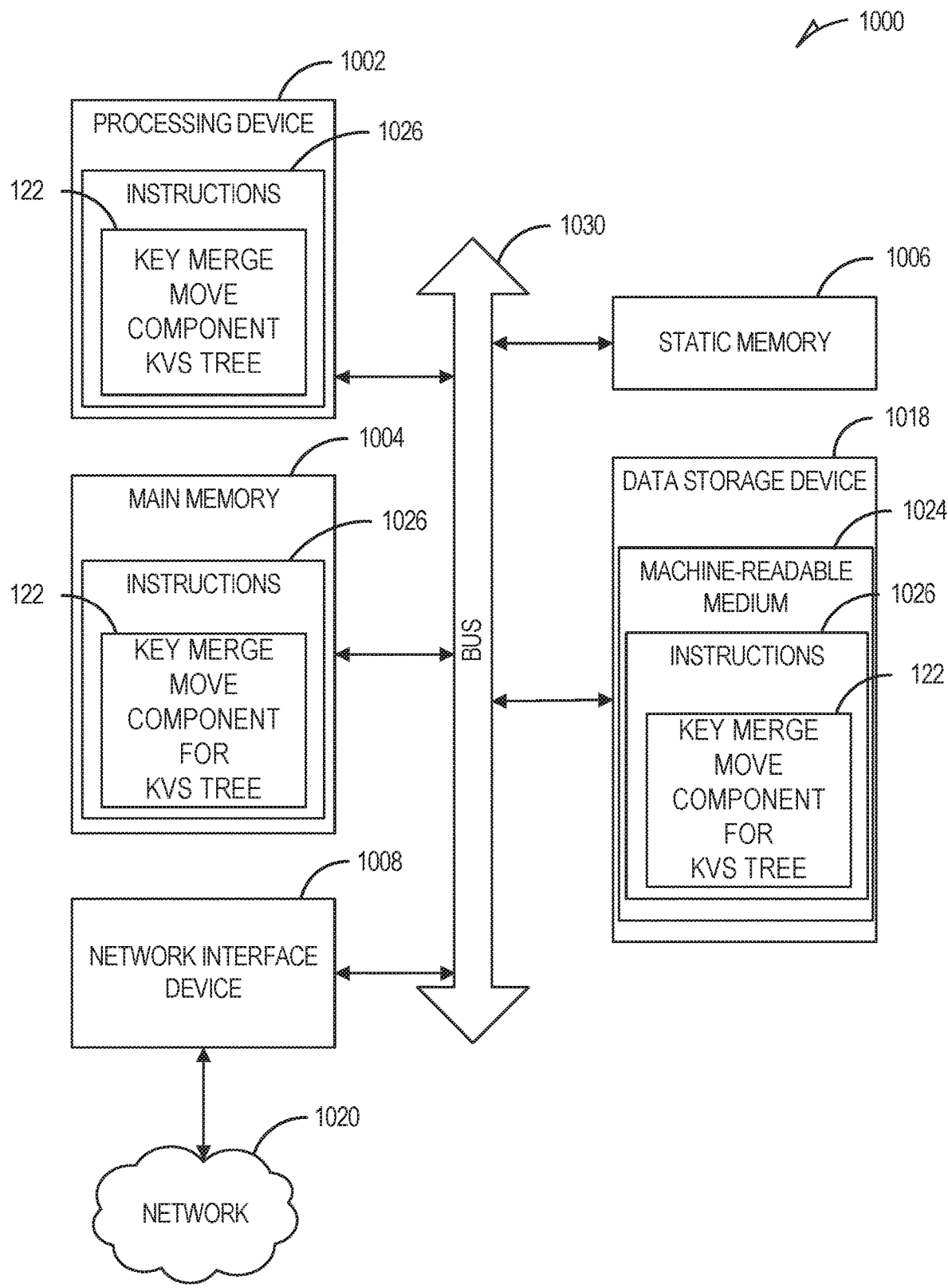
FIG. 10 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the key merge move component 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to a parity calculator with partial calculation tracking (e.g., the key merge move component 122 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards: or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader embodiments of the disclosure as set forth in the following claims. The specification and drawings are, accordingly, to be regarded in an illustrative sense rather than a restrictive sense.

Examples

Example 1 is a system comprising: a set of memory components storing a key-value store tree data structure, the key-value store tree data structure comprising a set of nodes, wherein a node in the set of nodes comprises a sequence of key value sets: and a processing device, operatively coupled to the set of memory components, configured to perform operations comprising: detecting for a condition to merge and move the sequence of key-value sets from the node of the key-value store tree data structure to a set of child nodes of the node: and in response to detecting the condition: determining whether the set of child nodes of the node comprises a leaf node; and moving the sequence of key-value sets to the set of child nodes based on the determining whether the set of child nodes comprises the leaf node.

In Example 2, the subject matter of Example 1 optionally includes where the moving the sequence of key-value sets to the set of child nodes comprises: in response to determining that the set of child nodes does not comprise the leaf node: merging the sequence of key-value sets to produce a merged key-value set comprising a set of new key blocks that reference a set of existing value blocks of the sequence of key-value sets, and the set of new key blocks being generated based on a set of existing key blocks of the sequence of key-value sets; and moving the merged key-value set into the set of child nodes of the node.

In Example 3, the subject matter of Example 1 or Example 2 optionally includes where the moving the merged key-value set into the set of child nodes of the node comprises: partitioning the merged key-value set into a set of split key-value sets, each split key-value set being assigned to a different child node in the set of child nodes: and moving each split key-value set, in the set of split key-value sets, to an assigned child node in the set of child nodes.

In Example 4, the subject matter of any one of Examples 1 to 3 optionally includes where the merging the sequence of key-value sets to produce the merged key-value set comprises, after the merged key-value is generated: in response to determining that the set of child nodes does not comprise the leaf node, deleting, from the node, each particular key-value set in the sequence of key-value sets, the deleting the particular key-value set comprising deleting one or more key blocks of the particular key-value set while leaving one or more value blocks of the particular key-value set.

In Example 5, the subject matter of any one of Examples 1 to 4 optionally includes where the set of new key blocks is generated based on the set of existing key blocks of the sequence of key-value sets by copying the set of existing key blocks such that the set of new key blocks comprises one or more references to the set of existing value blocks.

In Example 6, the subject matter of any one of Examples 1 to 5 optionally includes where each particular value block in the set of value blocks of the node is assigned a data generation number indicating a sequence order at which the particular value block was initially generated for the key-value store tree structure, and the moving the sequence of key-value sets to the set of child nodes comprises: in response to determining that the child node comprises the leaf node: merging the sequence of key-value sets to produce a merged key-value set comprising a set of new key blocks that reference a set of new value blocks, the set of new key blocks being generated based on a set of existing key blocks of the sequence of key-value sets, the set of new value blocks being generated based on a set of existing value blocks of the sequence of key-value sets; and the set of new value blocks being assigned a particular largest data generation number assigned to any value block in the set of existing value blocks; and moving the merged key-value set into the set of child nodes of the node.

In Example 7, the subject matter of any one of Examples 1 to 6 optionally includes where the moving the merged key-value set into the set of child nodes of the node comprises: partitioning the merged key-value set into a set of split key-value sets, each split key-value set being assigned to a different child node in the set of child nodes; and moving each split key-value set, in the set of split key-value sets, to an assigned child node in the set of child nodes.

In Example 8, the subject matter of any one of Examples 1 to 7 optionally includes where the merging the sequence of key-value sets to produce the merged key-value set comprises, after the merged key-value is generated: in response to determining that the set of child nodes does comprise the leaf node: determining a set of largest data generation numbers by determining, for each particular leaf node of the key-value store tree data structure, a largest data generation number assigned to any value block associated with the particular leaf node: determining a smallest data generation number in the set of largest data generation numbers; and deleting, from the node, each particular key-value set in the sequence of key-value sets, the deleting the particular key-value set comprising: deleting any existing value block, referenced by an existing key block of the particular key-value set, that has a particular data generation number that is less than the smallest data generation number, and deleting one or more existing key blocks of the particular key-value set.

In Example 9, the subject matter of any one of Examples 1 to 8 optionally includes where each particular value block in the set of value blocks of the node is assigned a data generation number indicating a sequence order at which the particular value block was initially generated for the key-value store tree structure, and the operations further comprise: determining a smallest data generation number in the set of largest data generation numbers; determining whether a particular data generation number of the given value block is less than the smallest data generation number; and deleting a given value block of the key-value store tree data structure in response to determining that the particular data generation number is less than the smallest data generation number.

In Example 10, the subject matter of any one of Examples 1 to 9 optionally includes where the system is a memory sub-system.

In Example 11, the subject matter of any one of Examples 1 to 10 optionally includes where a host system comprises the processing device, and a memory sub-system comprises the set of memory components.

Example 12 is a method comprising: generating, on a set of memory components, a key-value store tree data structure, the key-value store tree data structure comprising a set of nodes, wherein a node in the set of nodes comprises a sequence of key value sets; detecting, by a processing device, for a condition to merge and move the sequence of key-value sets from the node to a set of child nodes of the node; and in response to detecting the condition: determining, by the processing device, whether the set of child nodes of the node comprises a leaf node; and moving, by the processing device, the sequence of key-value sets to the set of child nodes based on the determining whether the set of child nodes comprises the leaf node.

In Example 13, the subject matter of Example 12 optionally includes where the moving the sequence of key-value sets to the set of child nodes comprises: in response to determining that the set of child nodes does not comprise the leaf node: merging the sequence of key-value sets to produce a merged key-value set comprising a set of new key blocks that reference a set of existing value blocks of the sequence of key-value sets, and the set of new key blocks being generated based on a set of existing key blocks of the sequence of key-value sets; and moving the merged key-value set into the set of child nodes of the node.

In Example 14, the subject matter of Example 12 or Example 13 optionally includes where the moving the merged key-value set into the set of child nodes of the node comprises: partitioning the merged key-value set into a set of split key-value sets, each split key-value set being assigned to a different child node in the set of child nodes; and moving each split key-value set, in the set of split key-value sets, to an assigned child node in the set of child nodes.

In Example 15, the subject matter of any one of Examples 12 to 14 optionally includes where the merging the sequence of key-value sets to produce the merged key-value set comprises, after the merged key-value is generated: in response to determining that the set of child nodes does not comprise the leaf node, deleting, from the node, each particular key-value set in the sequence of key-value sets, the deleting the particular key-value set comprising deleting one or more key blocks of the particular key-value set while leaving one or more value blocks of the particular key-value set.

In Example 16, the subject matter of any one of Examples 12 to 15 optionally includes where the set of new key blocks is generated based on the set of existing key blocks of the sequence of key-value sets by copying the set of existing key blocks such that the set of new key blocks comprises one or more references to the set of existing value blocks.

In Example 17, the subject matter of any one of Examples 12 to 16 optionally includes where each particular value block in the set of value blocks of the node is assigned a data generation number indicating a sequence order at which the particular value block was initially generated for the key-value store tree structure, and the moving the sequence of key-value sets to the set of child nodes comprises: in response to determining that the child node comprises the leaf node: merging the sequence of key-value sets to produce a merged key-value set comprising a set of new key blocks that reference a set of new value blocks, the set of new key blocks being generated based on a set of existing key blocks of the sequence of key-value sets, the set of new value blocks being generated based on a set of existing value blocks of the sequence of key-value sets: and the set of new value blocks being assigned a particular largest data generation number assigned to any value block in the set of existing value blocks; and moving the merged key-value set into the set of child nodes of the node.

In Example 18, the subject matter of any one of Examples 12 to 17 optionally includes where the moving the merged key-value set into the set of child nodes of the node comprises: partitioning the merged key-value set into a set of split key-value sets, each split key-value set being assigned to a different child node in the set of child nodes; and moving each split key-value set, in the set of split key-value sets, to an assigned child node in the set of child nodes.

In Example 19, the subject matter of any one of Examples 12 to 18 optionally includes where the merging the sequence of key-value sets to produce the merged key-value set comprises, after the merged key-value is generated: in response to determining that the set of child nodes does comprise the leaf node: determining a set of largest data generation numbers by determining, for each particular leaf node of the key-value store tree data structure, a largest data generation number assigned to any value block associated with the particular leaf node; determining a smallest data generation number in the set of largest data generation numbers; and deleting, from the node, each particular key-value set in the sequence of key-value sets, the deleting the particular key-value set comprising: deleting any existing value block, referenced by an existing key block of the particular key-value set, that has a particular data generation number that is less than the smallest data generation number, and deleting one or more existing key blocks of the particular key-value set.

Example 20 is a non-transitory machine-readable storage medium comprising instructions that, when executed by a processing device, cause the processing device to: access, on a set of memory components, a key-value store tree data structure, the key-value store tree data structure comprising a set of nodes, wherein a node in the set of nodes comprises a sequence of key value sets; detect for a condition to merge and move the sequence of key-value sets from the node to a set of child nodes of the node; and in response to detecting the condition: determine whether the set of child nodes of the node comprises a leaf node; and move the sequence of key-value sets to the set of child nodes based on the determining whether the set of child nodes comprises the leaf node.

What is claimed is:

1. A memory sub-system comprising:
a set, of memory components storing a key-value store tree data structure, the key-value store tree data structure comprising a set of nodes, wherein a node in the set of nodes comprises a sequence of key-value sets, wherein each key-value set of the node comprises at least one value block, and wherein each individual value block of the node is assigned a data generation number indicating a sequence order at which the individual value block was initially generated for the key-value store tree data structure; and
a processing device, operatively coupled to the set of memory components, configured to perform operations comprising:
    detecting for a condition to merge and move the sequence of key-value sets from the node of the key-value store tree data structure to a set of child nodes of the node; and in response to detecting the condition:
        determining whether the set of child nodes of the node comprises a leaf node; and
        in response to determining that the set of child nodes comprises the leaf node, moving the sequence of key-value sets to the set of child nodes, the moving the sequence of key-value sets to the set of child nodes comprising:
            merging the sequence of key-value sets to produce a merged key-value set, the merged key-value set comprising a set of new key blocks that reference a set of new value blocks, and the set of new value blocks being assigned a particular largest data generation number assigned to any value block in a set of existing value blocks of the sequence of key-value sets.

2. The memory sub-system of claim 1, wherein the moving the sequence of key-value sets to the set of child nodes comprises:
in response to determining that the set of child nodes does not comprise the leaf node:
merging the sequence of key-value sets to produce the merged key-value set comprising the set of new key blocks that reference the set of existing value blocks of the sequence of key-value sets, and the set of new key blocks being generated based on a set of existing key blocks of the sequence of key-value sets; and
moving the merged key-value set into the set of child nodes of the node.

3. The memory sub-system of claim 2, wherein the moving the merged key-value set into the set of child nodes of the node comprises:
partitioning the merged key-value set into a set of split key-value sets, each split key-value set being assigned to a different child node in the set of child nodes; and
moving each split key-value set, in the set of split key-value sets, to an assigned child node in the set of child nodes.

4. The memory sub-system of claim 2, wherein the merging the sequence of key-value sets to produce the merged key-value set comprises, after the merged key-value is generated:
in response to determining that the set of child nodes does not comprise the leaf node, deleting, from the node, each particular key-value set in the sequence of key-value sets, the deleting the particular key-value set comprising deleting one or more key blocks of the particular key-value set while leaving one or more value blocks of the particular key-value set.

5. The memory sub-system of claim 2, wherein the set of new key blocks is generated based on the set of existing key blocks of the sequence of key-value sets by copying the set of existing key blocks such that the set of new key blocks comprises one or more references to the set of existing value blocks.

6. The memory sub-system of claim 1, wherein the moving the sequence of key-value sets to the set of child nodes comprises:
moving the merged key-value set into the set of child nodes of the node.

7. The memory sub-system of claim 6, wherein the moving the merged key-value set into the set of child nodes of the node comprises:

partitioning the merged key-value set into a set of split key-value sets, each split key-value set being assigned to a different child node in the set of child nodes; and moving each split key-value set, in the set of split key-value sets, to an assigned child node in the set of child nodes.

8. The memory sub-system of claim 1, wherein the merging the sequence of key-value sets to produce the merged key-value set comprises, after the merged key-value set is generated:

determining a set of largest data generation numbers by determining, for each particular leaf node of the key-value store tree data structure, a largest data generation number assigned to any value block associated with the particular leaf node;

determining a smallest data generation number in the set of largest data generation numbers; and deleting, from the node, each particular key-value set in the sequence of key-value sets, the deleting the particular key-value set comprising:

deleting any existing value block, referenced by an existing key block of the particular key-value set, that has a particular data generation number that is less than the smallest data generation number; and deleting one or more existing key blocks of the particular key-value set.

9. The memory sub-system of claim 1, wherein the operations further comprise:

determining a smallest data generation number in a set of largest data generation numbers determined;

determining whether a particular data generation number of a given value block is less than the smallest data generation number; and deleting the given value block of the key-value store tree data structure in response to determining that the particular data generation number is less than the smallest data generation number.

10. The memory sub-system of claim 1, wherein a host system comprises the processing device, and the memory sub-system comprises the set of memory components.

11. A method comprising:

generating, on a set of memory components of a memory sub-system, a key-value store tree data structure, the key-value store tree data structure comprising a set of nodes, wherein a node in the set of nodes comprises a sequence of key-value sets, wherein each key-value set of the node comprises at least one value block, and wherein each individual value block of the node is assigned a data generation number indicating a sequence order at which the individual value block was initially generated for the key-value store tree data structure;

detecting, by a processing device of the memory sub-system, for a condition to merge and move the sequence of key-value sets from the node to a set of child nodes of the node; and in response to detecting the condition:

determining, by the processing device, whether the set of child nodes of the node comprises a leaf node; and in response to determining that the set of child nodes comprises the leaf node, moving, by the processing device, the sequence of key-value sets to the set of child nodes, the moving the sequence of key-value sets to the set of child nodes comprising:

merging the sequence of key-value sets to produce a merged key-value set, the merged key-value set comprising a set of new key blocks that reference a set of new value blocks, and the set of new value blocks being assigned a particular largest data generation number assigned to any value block in a set of existing value blocks of the sequence of key-value sets.

12. The method of claim 11, wherein the moving the sequence of key-value sets to the set of child nodes comprises:

in response to determining that the set of child nodes does not comprise the leaf node:

merging the sequence of key-value sets to produce the merged key-value set comprising the set of new key blocks that reference the set of existing value blocks of the sequence of key-value sets, and the set of new key blocks being generated based on the set of existing key blocks of the sequence of key-value sets; and moving the merged key-value set into the set of child nodes of the node.

13. The method of claim 12, wherein the moving the merged key-value set into the set of child nodes of the node comprises:

partitioning the merged key-value set into a set of split key-value sets, each split key-value set being assigned to a different child node in the set of child nodes; and moving each split key-value set, in the set of split key-value sets, to an assigned child node in the set of child nodes.

14. The method of claim 12, wherein the merging the sequence of key-value sets to produce the merged key-value set comprises, after the merged key-value set is generated:

in response to determining that the set of child nodes does not comprise the leaf node, deleting, from the node, each particular key-value set in the sequence of key-value sets, the deleting the particular key-value set comprising deleting one or more key blocks of the particular key-value set while leaving one or more value blocks of the particular key-value set.

15. The method of claim 12, wherein the set of new key blocks is generated based on the set of existing key blocks of the sequence of key-value sets by copying the set of existing key blocks such that the set of new key blocks comprises one or more references to the set of existing value blocks.

16. The method of claim 11, wherein the moving the sequence of key-value sets to the set of child nodes comprises:

moving the merged key-value set into the set of child nodes of the node.

17. The method of claim 16, wherein the moving the merged key-value set into the set of child nodes of the node comprises:

partitioning the merged key-value set into a set of split key-value sets, each split key-value set being assigned to a different child node in the set of child nodes; and moving each split key-value set, in the set of split key-value sets, to an assigned child node in the set of child nodes.

18. The method of claim 11, wherein the merging the sequence of key-value sets to produce the merged key-value set comprises, after the merged key-value is generated:

determining a set of largest data generation numbers by determining, for each particular leaf node of the key-value store tree data structure, a largest data generation number assigned to any value block associated with the particular leaf node;

determining a smallest data generation number in the set of largest data generation numbers; and deleting, from the node, each particular key-value set in the sequence of key-value sets, the deleting the particular key-value set, comprising:

deleting any existing value block, referenced by an existing key block of the particular key-value set, that has a particular data generation number that is less than the smallest data generation number; and deleting one or more existing key blocks of the particular key-value set.

19. A non-transitory machine-readable storage medium comprising instructions that, when executed by a processing device of a memory sub-system, cause the processing device to:

access, on a set of memory components of the memory sub-system, a key-value store tree data structure, the key-value store tree data structure comprising a set of nodes, wherein a node in the set of nodes comprises a sequence of key-value sets, wherein each key-value set of the node comprises at least one value block, and wherein each individual value block of the node is assigned a data generation number indicating a sequence order at which the individual value block was initially generated for the key-value store tree data structure;

detect for a condition to merge and move the sequence of key-value sets from the node to a set of child nodes of the node; and in response to detecting the condition:

determine whether the set of child nodes of the node comprises a leaf node; and in response to determining that the set of child nodes comprises the leaf node, move the sequence of key-value sets to the set of child nodes, the moving the sequence of key-value sets to the set of child nodes comprising:

merging the sequence of key-value sets to produce a merged key-value set, the merged key-value set comprising a set of new key blocks that reference a set of new value blocks, and the set of new value blocks being assigned a particular largest data generation number assigned to any value block in a set of existing value blocks of the sequence of key-value sets.

20. The non-transitory machine-readable storage medium of claim 19, wherein the moving the sequence of key-value sets to the set of child nodes comprises:

moving the merged key-value set into the set of child nodes of the node.

\* \* \* \* \*